United States Patent
Mihira et al.

(10) Patent No.: US 9,100,513 B2
(45) Date of Patent: Aug. 4, 2015

(54) IMAGE PROCESSING APPARATUS AND METHOD OF CONTROLLING THE IMAGE PROCESSING APPARATUS

(75) Inventors: Yoshiro Mihira, Inagi (JP); Kenta Yabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1217 days.

(21) Appl. No.: 12/940,893

(22) Filed: Nov. 5, 2010

(65) Prior Publication Data

US 2011/0109427 A1 May 12, 2011

(30) Foreign Application Priority Data

Nov. 12, 2009 (WO) .................. PCT/JP2009/069292

(51) Int. Cl.
| | | |
|---|---|---|
| G05B 19/00 | (2006.01) | |
| G06F 15/00 | (2006.01) | |
| H04N 1/00 | (2006.01) | |
| G06F 21/60 | (2013.01) | |

(52) U.S. Cl.
CPC .......... *H04N 1/00127* (2013.01); *G06F 21/608* (2013.01); *H04N 1/00222* (2013.01); *H04N 1/00244* (2013.01); *H04N 2201/3205* (2013.01); *H04N 2201/3235* (2013.01); *H04N 2201/3246* (2013.01); *H04N 2201/3276* (2013.01)

(58) Field of Classification Search
None
See application file for complete search history.

(56) References Cited

U.S. PATENT DOCUMENTS

| | | | | |
|---|---|---|---|---|
| 6,334,161 | B1* | 12/2001 | Suzuki et al. | 710/29 |
| 7,693,298 | B2* | 4/2010 | Fukui et al. | 382/100 |
| 8,108,938 | B2* | 1/2012 | Osada | 726/27 |
| 8,166,542 | B2* | 4/2012 | Uno | 358/1.15 |
| 8,218,165 | B2* | 7/2012 | Matsushima | 358/1.14 |
| 2006/0271781 | A1* | 11/2006 | Murakawa | 713/168 |
| 2007/0140557 | A1* | 6/2007 | Osada | 382/167 |
| 2007/0216935 | A1* | 9/2007 | Osamura et al. | 358/1.15 |
| 2007/0223030 | A1* | 9/2007 | Miyajima | 358/1.14 |
| 2008/0060070 | A1* | 3/2008 | Uno | 726/21 |
| 2008/0074693 | A1* | 3/2008 | Hashimoto et al. | 358/1.15 |
| 2008/0170258 | A1* | 7/2008 | Yamamura | 358/1.15 |
| 2008/0244712 | A1* | 10/2008 | Kitada et al. | 726/5 |
| 2009/0027722 | A1* | 1/2009 | Tsujimoto | 358/1.15 |
| 2009/0251724 | A1* | 10/2009 | Nakajima | 358/1.15 |
| 2009/0276847 | A1* | 11/2009 | Kotaka | 726/17 |
| 2010/0031346 | A1* | 2/2010 | Kano | 726/19 |
| 2010/0214600 | A1* | 8/2010 | Yagi | 358/1.15 |
| 2011/0179466 | A1* | 7/2011 | Hamada | 726/3 |

FOREIGN PATENT DOCUMENTS

| | | |
|---|---|---|
| JP | 2005-65200 A | 3/2005 |
| JP | 2007-174062 A | 7/2007 |

(Continued)

*Primary Examiner* — Andrew Nalven
*Assistant Examiner* — Christopher Ruprecht
(74) *Attorney, Agent, or Firm* — Carter, DeLuca, Farrell & Schmidt, LLP

(57) ABSTRACT

A process to generate a request for a copy process occurs at the side of a Web server before the copying is actually started since a user has selected the copy function of an MFP. If the user instructs logout from the MFP during the process, it is determined that the user has no right because the authentication context of the user is deleted from the MFP. Accordingly, it is not possible for the user to perform the copying.
Upon logout of the user from an image processing apparatus, if a processing request that is received is generated by an external apparatus on the basis of operation information transmitted in accordance with an operation by the login user, the image processing is permitted to be performed in response to the processing request.

14 Claims, 16 Drawing Sheets

(56) References Cited

FOREIGN PATENT DOCUMENTS

| | | |
|---|---|---|
| JP | 2007-213419 A | 8/2007 |
| JP | 2007-245627 A | 9/2007 |
| JP | 2008-90820 A | 4/2008 |
| JP | 2009-33241 A | 2/2009 |

* cited by examiner

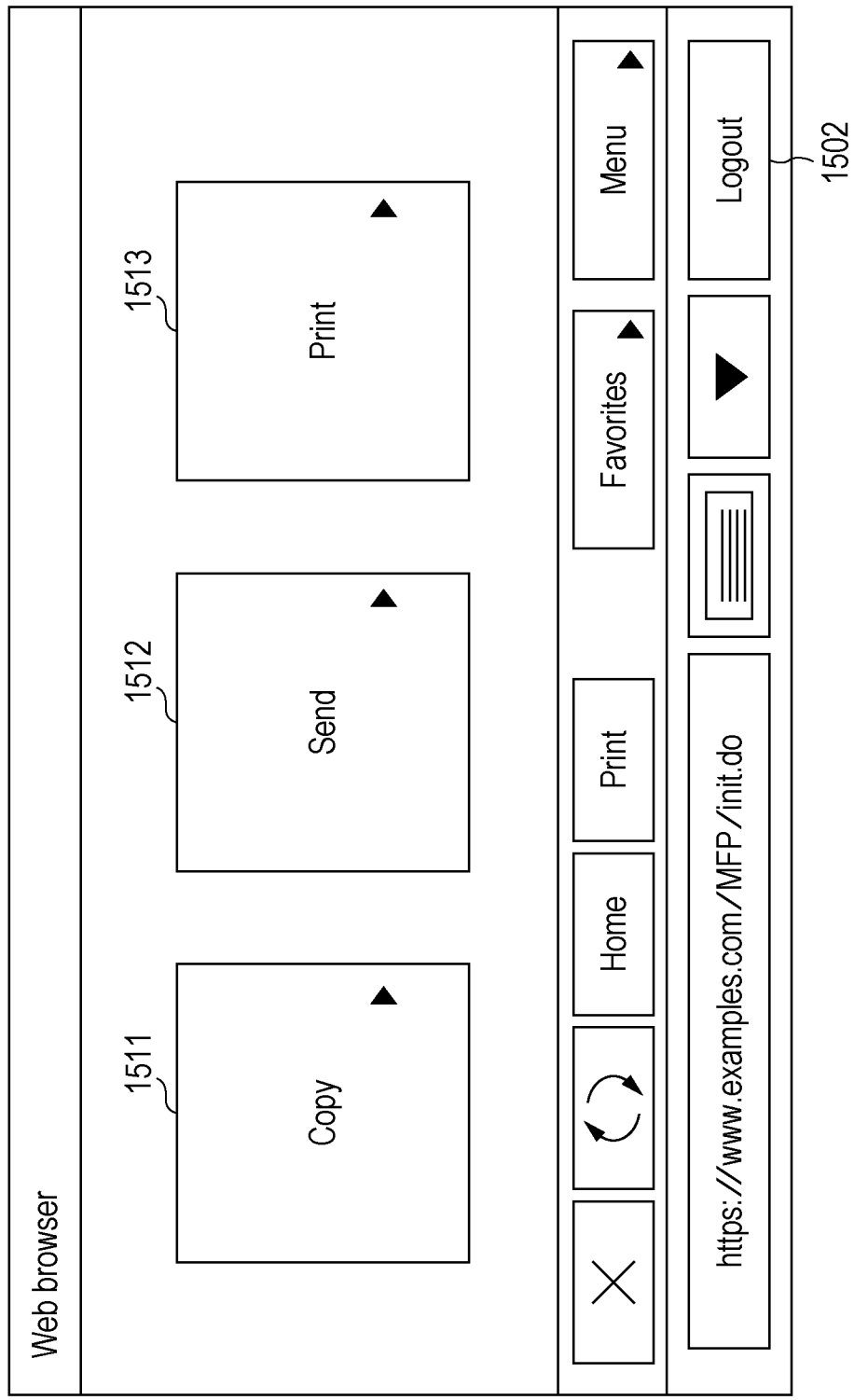

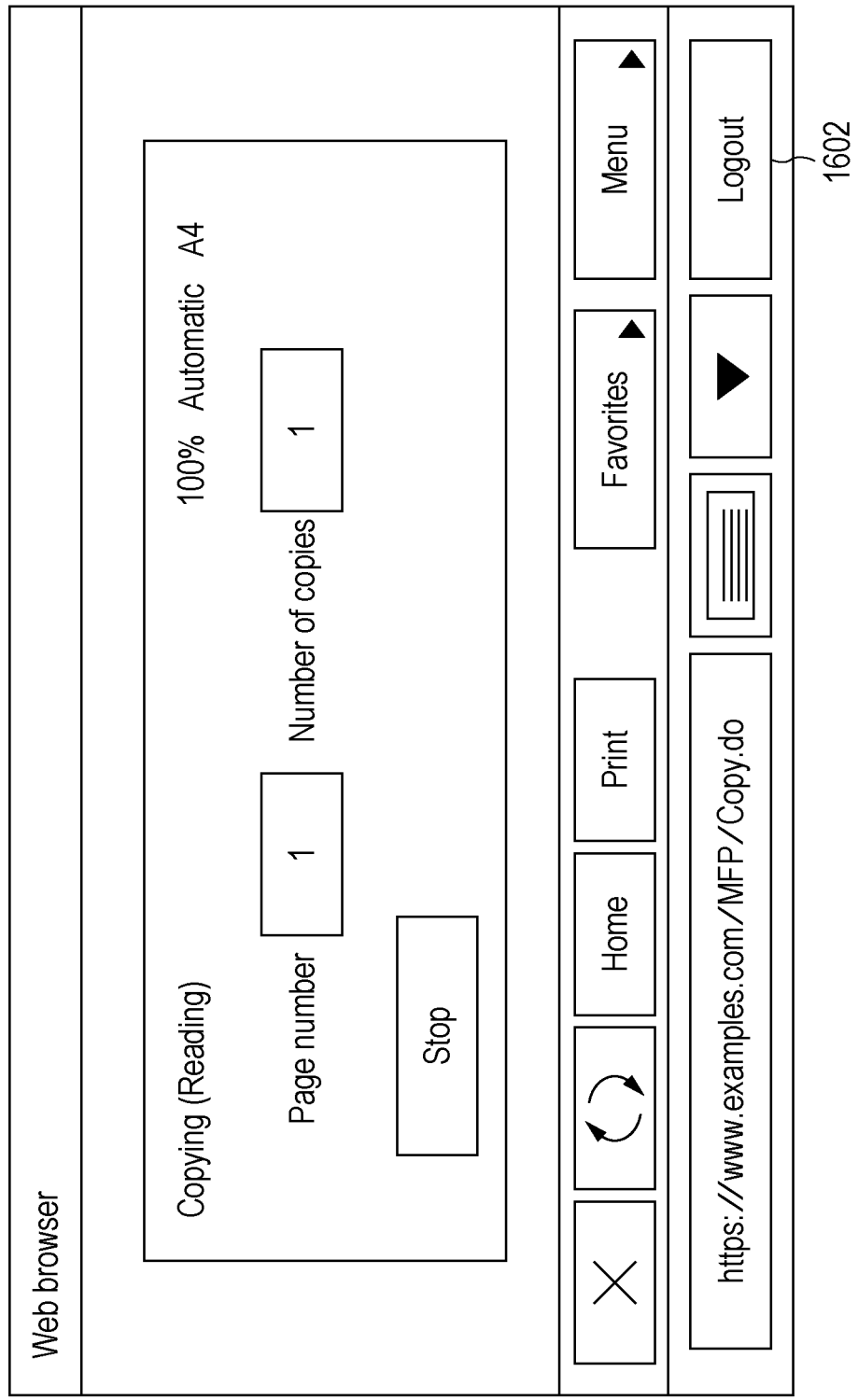

IMAGE PROCESSING APPARATUS AND METHOD OF CONTROLLING THE IMAGE PROCESSING APPARATUS

TECHNICAL FIELD

The present invention relates to an image processing apparatus capable of performing image processing in response to a processing request from an external apparatus and to a control method.

BACKGROUND ART

In recent years, multi function peripherals (MFPs) having a printer function and a scanner function each have a Web browser installed therein to access a Web server. Accordingly, the MFP can directly operate a Web application in the Web server.

In addition, a system concerning the MFP provided with the Web browser is known, in which information about an operation screen used for performing the functions which the MFP originally has is received from the Web server and the received information is operated by using the Web browser. In this system, a user inputs an instruction to, for example, select a copy function of the MFP with the operation screen displayed in the Web browser. The input instruction is transmitted to the Web server by the Web browser of the MFP. The Web server generates a request for a copy process to the MFP in accordance with the content of the instruction transmitted from the Web browser and transmits the generated request to the MFP. The MFP receives the request for the copy process and performs the copying on the basis of the received request. The cooperation process between the MFP and the Web server described above eliminates the need to hold the information about the operation screen used for operating the MFP in the MFP. In addition, the operation screen can be changed by a method similar to that for changing a general Web application on the Web server.

A technology to authenticate a specific user as a user who is permitted to use the copy function when the specific user attempts to use the copy function of the MFP is disclosed in Patent Document 1.

According to Patent Document 1, authentication information about the user who has logged into the MFP is stored in the MFP during a period from the time when the user logs in the MFP to the time when the user logs out from the MFP. Upon selection of the copy function of the MFP by the user who has logged into the MFP, the MFP determines whether the user has a right to the selected function on the basis of the stored authentication information about the user. If the MFP determines that the user has the right to the selected copy function, the MFP permits the user to perform the copying and the user can perform the copying. The authentication information about the user is deleted when the user logs out from the MFP.

Citation List

Patent Literature

PTL 1 Japanese Patent Laid-Open No. 2007-213419

For example, when the copy function of the MFP is to be performed, the copying can be appropriately performed in accordance with the right of the user who has logged in according to the technology disclosed in Patent Document 1. However, the use of the technology in Patent Document 1 in the case in which the copying is performed by the cooperation process between the MFP and the Web server described above can cause problems in the following case.

Specifically, the problems can be caused in a case in which the user instructs the logout from the MFP before the copying is started since the user has selected the copy function. More specifically, a process to generate a request for the copy process occurs at the side of the Web server during a period between when the user has selected the copy function of the MFP and when the copying is actually started. The user possibly instructs the logout from the MFP during this process. Since the authentication information about the user is deleted from the MFP when the logout process is performed in response to the instruction of the logout, it is determined that the user does not have the right to the copy function in the determination of whether the user has the right to the copy function. As a result, the user is prevented from performing the copying.

As described above, if the user instructs the logout from an image processing apparatus while an external apparatus is generating a processing request, it is not possible to perform the image processing in response to the processing request even if the processing request is received from the external apparatus.

The present invention provides an image processing apparatus capable of continuing image processing in response to a processing request before logout is instructed even if the user instructs the logout while an external apparatus is generating a processing request.

SUMMARY OF INVENTION

An image processing apparatus according to an embodiment of the present invention is capable of communicating with an external apparatus. The image processing apparatus includes a storage unit configured to store first authentication information about a user, in a case where the user logs in the image processing apparatus; an accepting unit configured to accept an instruction from the user who logs in the image processing apparatus; a notifying unit configured to notify the external apparatus of the accepted instruction; a reception unit configured to receive a processing request generated on the basis of the notified instruction from the external apparatus with second authentication information; a determination unit configured to determine whether the stored first authentication information coincides with the received second authentication information; a process unit configured to execute image processing in accordance with the processing request received by the reception unit if the determination unit determines that the first authentication information about the user coincides with the second authentication information; and a control unit configured to cause the storage unit to store the first authentication information about the user at least before the determination unit determines that the first authentication information about the user coincides with the second authentication information and to cause the storage unit not to store the first authentication information about the user if the user has logged out from the image processing apparatus and the determination unit determines that the first authentication information about the user coincides with the second authentication information.

An image processing apparatus according to another embodiment of the present invention is capable of communicating with an external apparatus. The image processing apparatus includes a storage unit configured to store first authentication information about a user, in a case where the user logs in the image processing apparatus; an accepting unit configured to accept an instruction from the user who logs in the image processing apparatus; a notifying unit configured to notify the external apparatus of the accepted instruction; a reception unit configured to receive a processing request generated on the basis of the notified instruction from the external apparatus with second authentication information; a process unit configured to execute image processing in response to the processing request received by the reception unit; a first control unit configured to permit execution of the image processing in accordance with the received processing request if the reception unit receives the processing request based on the instruction accepted from the user who logs in the image processing apparatus; and a second control unit configured to restrict the user logging out from the image processing apparatus if the reception unit does not receive the processing request based on the instruction accepted from the user who logs in the image processing apparatus.

Further features of the present invention will become apparent from the following description of exemplary embodiments with reference to the attached drawings.

BRIEF DESCRIPTION OF DRAWINGS

FIG. 15 shows a menu screen in the second embodiment; and

FIG. 16 shows a copying screen in the second embodiment.

DESCRIPTION OF EMBODIMENTS

Figure 1:
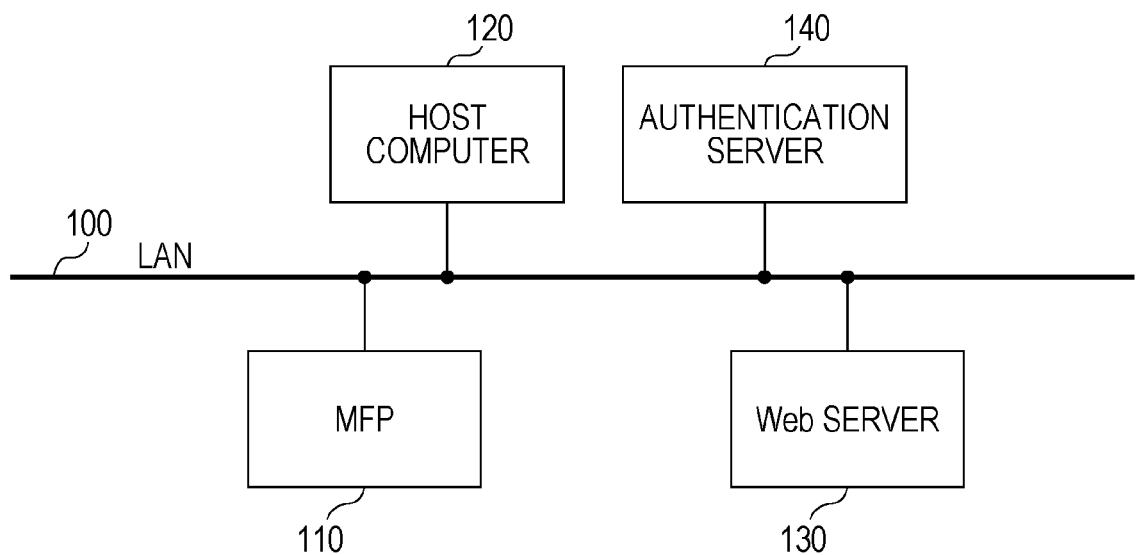
FIG. 1 illustrates the configuration of a system according to a first embodiment.

Embodiments of the present invention will herein be described with reference to the attached drawings. The same reference numerals are used to identify the same functions in each drawing and a duplicate description of such functions is omitted herein.

First Embodiment

The network configuration of a system in a first embodiment will now be described with reference to FIG. 1. In the system in FIG. 1, an MFP 110, a host computer 120, a Web server 130, and an authentication server 140 are communicatably connected to each other via a local area network (LAN) 100.

The LAN 100 is connected to a wide area network (WAN) or the Internet.

The MFP 110 is an apparatus having multiple functions including a scanner function, a print function, a copy function, and a transmission function. The MFP 110 performs input and output of image data, transmission and reception of image data, and a variety of image processing. Although the MFP 110 is an exemplary image processing apparatus, the image processing apparatus of the present invention is not limited to the MFP 110. The image processing apparatus of the present invention may be a single function peripheral (SFP) having any of the scanner function, the printer function, the copy function, and the transmission function.

The host computer 120 is an apparatus that receives a service from the MFP 110. The host computer 120 is, for example, a personal computer (PC), a personal digital assistant (PDA), or a mobile phone.

The Web server 130 is an apparatus that provides screen information used for displaying an operation screen to the MFP 110 and requests a Web service from the MFP 110. The Web server 130 is an exemplary external apparatus. The Web server 130 may be an apparatus integrated with the host computer 120.

The authentication server 140 is an apparatus that authenticates a user who attempts to log in the MFP 110. The authentication server 140 registers authentication information for identifying the user in advance, performs user authentication in response to an inquiry from the MFP 110, and transmits the result of the user authentication to the MFP 110. The authentication server 140 is, for example, a Lightweight Directory Access Protocol (LDAP) server. The authentication server 140 may be integrated with the Web server 130. Alternatively, the authentication server 140 may be integrated with the MFP 110.

Figure 2:
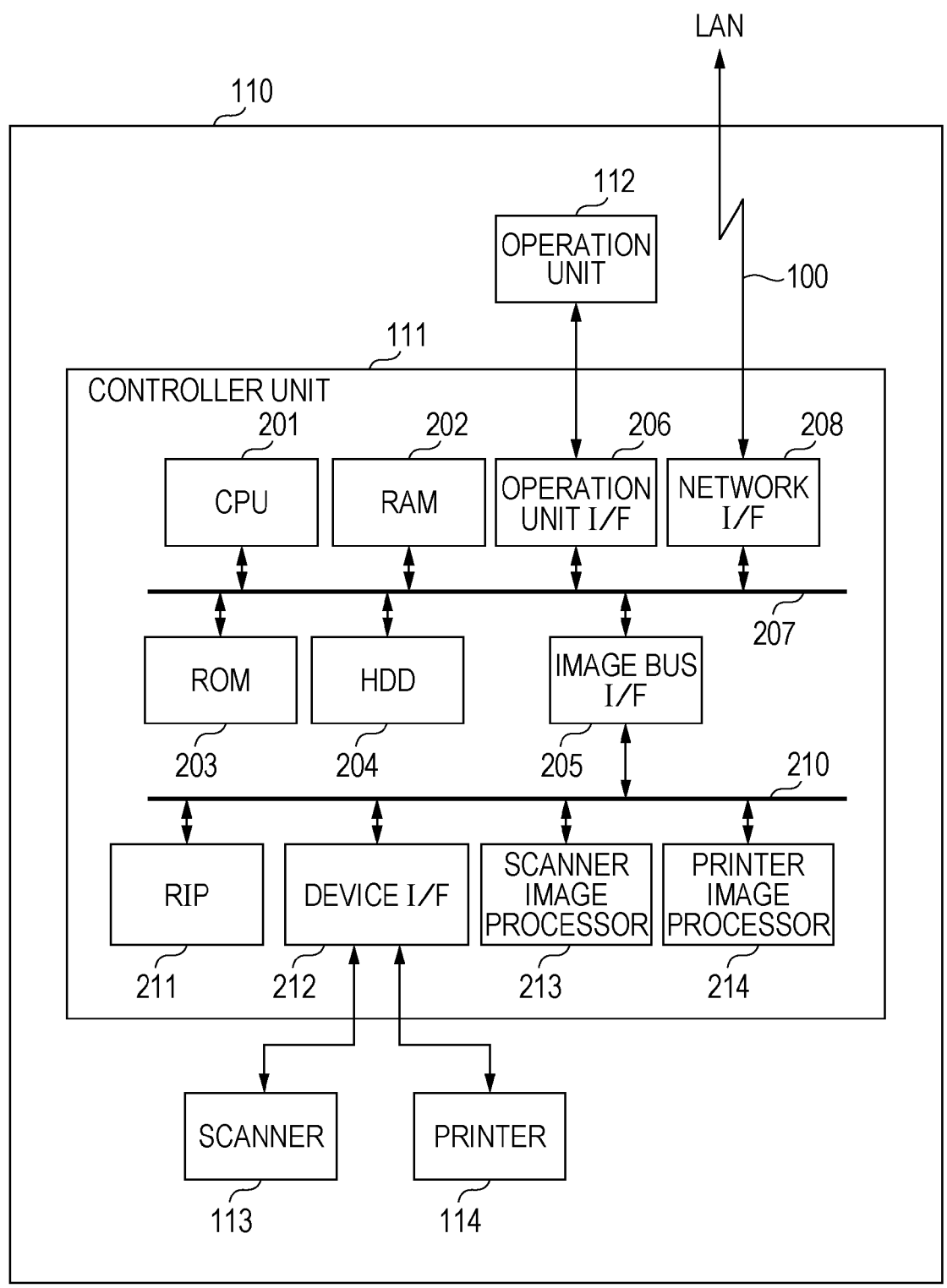
FIG. 2 shows the hardware configuration of an MFP.

Next, the hardware configuration of the MFP 110 will be described with reference to FIG. 2. The MFP 110 includes a controller unit 111, an operation unit 112, a scanner 113, and a printer 114.

The controller unit 111 is connected to the scanner 113 and the printer 114 to control the scanner 113 and the printer 114. In addition, the controller unit 111 is connected to the LAN 100 or a public line (not shown) to input and output image data, apparatus information, control information, and so on.

The operation unit 112 is a unit that supplies information about an operation by the user to an operation unit interface (I/F) 206. The operation unit 112 includes a keyboard used for operations for the controller unit 111 and a liquid crystal panel on which the image data and/or various functions are displayed. The keyboard includes an identification (ID) key used for instructing the login to the MFP 110 or the logout from the MFP 110.

The scanner 113 is an apparatus that reads out an image of an original document. The scanner 113 includes a document feed unit that conveys a document sheet and a scanner unit that optically reads out an image of an original document to convert the readout image into image data, which is an electrical signal.

The printer 114 is an apparatus that outputs image data. The printer 114 includes a paper feed unit including multiple-stage paper cassettes in which recording sheets of paper are housed, a marking unit that transfers and fixes image data on a recording sheet of paper, and a paper output unit that performs sorting and/or stapling to the printed recording sheet of paper and externally outputs the recording sheet of paper subjected to the sorting and/or the stapling.

The controller unit 111 includes a central processing unit (CPU) 201, a random access memory (RAM) 202, a read only memory (ROM) 203, a hard disk drive (HDD) 204, an image bus I/F 205, an operation unit I/F 206, and a network I/F 208. The components are connected to each other via a system bus 207.

The CPU 201 controls the entire operation of the MFP 110. The CPU 201 reads out a program stored in the ROM 203 or the HDD 204 into the RAM 202 and executes the readout program to perform various control processes.

The RAM 202 is a memory serving as a working area of the CPU 201. The RAM 202 is also used as an image memory that temporarily stores the image data. The RAM 202 is an exemplary volatile storage apparatus.

The ROM 203 is a boot ROM. A boot program of the system is stored in the ROM 203.

The HDD 204 has, for example, system software and image data stored therein. The HDD 204 is an exemplary non-volatile storage apparatus.

The image bus I/F 205 is a bus bridge that connects the system bus 207 to an image bus 210 to convert the data structure.

The operation unit I/F 206 is an interface used for inputting and outputting data between the operation unit 112 and the controller unit 111. The operation unit I/F 206 supplies information input by the user with the operation unit 112 to the CPU 201 and supplies the image data to be displayed on the liquid crystal panel of the operation unit 112 to the operation unit 112.

The network I/F 208 is connected to the LAN 100 to input and output information into and from the LAN 100.

The image bus 210 is used to connect a raster image processor (RIP) 211, a device I/F 212, a scanner image processor 213, and a printer image processor 214.

The RIP 211 decomposes Page Description Language (PDL) code that is received via the LAN 100 into bitmap image.

The device I/F 212 is used to connect the scanner 113 to the controller unit 111 and to connect and the printer 114 to the controller unit 111.

The scanner image processor 213 performs, for example, correction, processing, and editing of input image data.

The printer image processor 214 performs, for example, printer correction and resolution conversion to printout image data.

Figure 3:
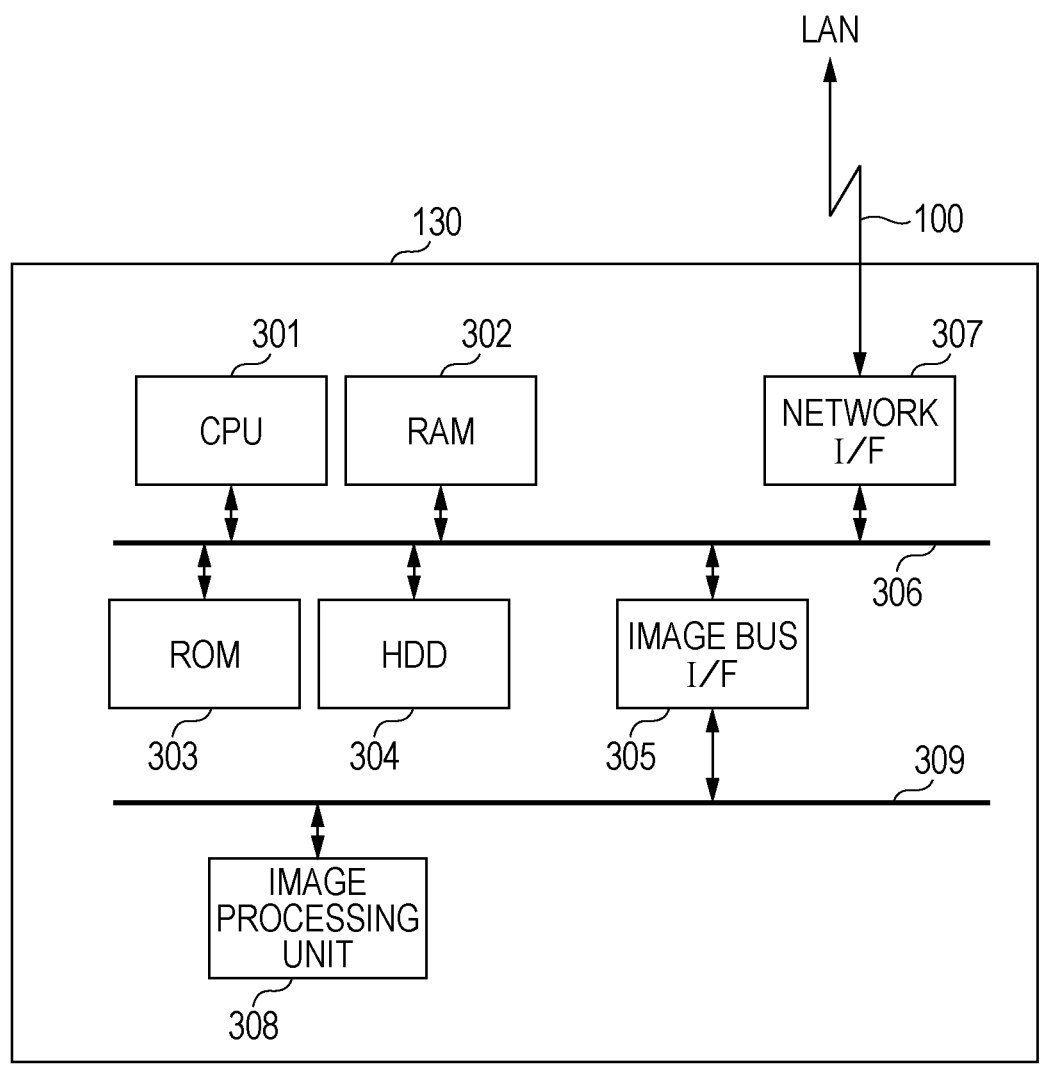
FIG. 3 shows the hardware configuration of a Web server.

Next, the hardware configuration of the Web server 130 will be described with reference to FIG. 3. The Web server 130 includes a CPU 301, a RAM 302, a ROM 303, an HDD 304, an image bus I/F 305, a network I/F 307, an image processing unit 308, and an image bus 309. The components are connected to each other via a system bus 306.

The CPU 301 controls the entire operation of the Web server 130. The CPU 301 reads out a program stored in the ROM 303 or the HDD 304 into the RAM 302 and executes the readout program to perform various control processes.

The RAM 302 serves as a system working memory used for operating the CPU 301. A program and/or image data read out by the CPU 301 are temporarily stored in the RAM 302.

The ROM 303 is a boot ROM. A boot program of the system is stored in the ROM 303.

The HDD 304 has, for example, system software and image data stored therein.

The image bus I/F 305 is a bus bridge that connects the system bus 306 to the image bus 309 through which the image data is transferred to convert the data structure. The network I/F 307 inputs and outputs image data and a variety of information between the Web server 130 and another apparatus via the LAN 100.

The image processing unit 308 performs the image processing to image data that is read out by the scanner 113 and to image data to be supplied to the printer 114.

Figure 4:
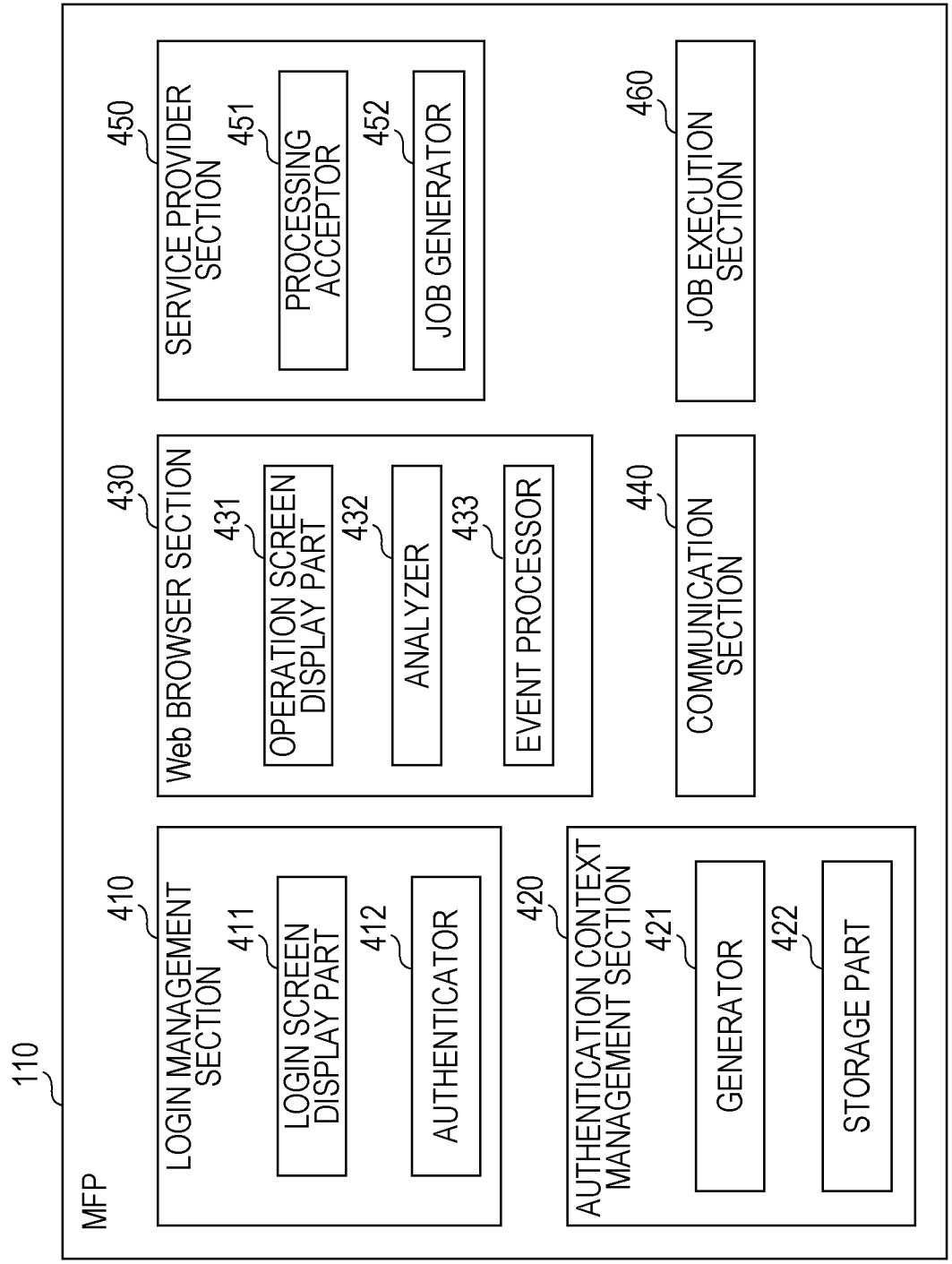
FIG. 4 shows the software configuration of the MFP.

Next, the functional configuration of a program executed by the MFP 110 will be described with reference to FIG. 4. FIG. 4 shows the functional configuration of the program decomposed in the RAM 202.

The program includes a login management section 410, an authentication context management section 420, a Web browser section 430, a communication section 440, a service provider section 450, and a job execution section 460.

The login management section 410 includes a login screen display part 411 and an authenticator 412. The login management section 410 monitors a state in which the user logs in the MFP 110 or a state in which the user logs out from the MFP 110.

The login screen display part 411 displays a login screen with which the user inputs the authentication information in the operation unit 112. This operation screen is not a screen provided by the Web server 130 but a screen displaying information that is held in the MFP 110 and that is read out from the MFP 110.

The authenticator 412 uses the authentication information input with the login screen displayed by the login screen display part 411 to perform the user authentication. Specifically, the authenticator 412 inquires of the authentication server 140 about the input authentication information to determine whether a login process is performed in accordance with the result of the inquiry. If the user authentication succeeds, the authenticator 412 passes information necessary to generate an authentication context to the authentication context management section 420. The authentication context includes the authentication information generated in response to the user who has logged into the MFP 110, the authentication information acquired from the authentication server 140 or the Web server 130 in response to the success of the login to the MFP 110 by the user, and identification information used for identifying the user. The authentication context will be described in detail below with reference to FIG. 8.

The authentication context management section 420 is a module that manages the authentication context concerning the user who has logged into the MFP 110. The authentication context management section 420 includes a generator 421 and a storage part 422.

The generator 421 generates the authentication context concerning the user who has logged in. The generator 421 generates the authentication context on the basis of the authentication information about the user authenticated by the authenticator 412. An operation by the user after the authentication context is generated is performed on the basis of the right of the user written in the authentication context.

The storage part 422 holds the authentication context generated by the generator 421. The authentication context may be held in the Web browser section 430 and/or the service provider section 450, instead of being held in the storage part 422 in the authentication context management section 420. When the authentication context is held in each of the Web browser section 430 and the service provider section 450, the login or logout state of the user is managed for every functional section.

The Web browser section 430 includes an operation screen display part 431, an analyzer 432, and an event processor 433.

The operation screen display part 431 displays the operation screen in the operation unit 112 on the basis of the result of analysis in the analyzer 432.

The analyzer 432 analyzes a Hypertext Markup Language (HTML) file received from a presentation part 501 through the communication section 440. The HTML file includes a description indicating the operation screen to be displayed on the Web browser section 430.

The event processor 433 generates an event to be transmitted to the Web server 130 in accordance with the content of a button operated on the operation screen displayed by the operation screen display part 431. Specifically, the event processor 433 generates a Hypertext Transfer Protocol (HTTP) request message conforming to the HTTP to be transmitted to a Web application section 500.

The communication section 440 submits an HTTP request to a resource described by a uniform resource locator (URL) through the network I/F 208 and receives a response to the HTTP request. The communication section 440 performs encoding and decoding of communication data conforming to various encoding formats in this process.

The service provider section 450 is a module that provides a Web service requested from the Web server 130. Specifically, the service provider section 450 causes the scanner image processor 213 or the printer image processor 214 to perform the image processing in accordance with the content of a Simple Object Access Protocol (SOAP) request message received from the Web server 130. The SOAP request message is used to deliver, for example, parameters (including scanning settings and transmission settings received from the Web browser section 430) used in the image processing. The service provider section 450 includes a processing acceptor 451 and a job generator 452.

The processing acceptor 451 receives a processing request from the Web server 130 as a Web service and passes the processing request to the job generator 452. The processing request is a message conforming to the SOAP. The job generator 452 interprets the SOAP request message received from the Web server 130 to generate a job and instructs the job execution section 460 to execute the job. Although the job generator 452 interprets the SOAP request message received by the processing acceptor 451 to generate a job, the present invention is not limited to this. For example, the job generator 452 may interpret a job script embedded in an HTTP message received by the Web browser section 430 to generate a job. Although the SOAP is used as the communication protocol, another protocol may be used to receive the processing request.

The job execution section 460 executes the job generated by the job generator 452. Specifically, the job execution section 460 performs, for example, the printing process with the printer 114, the scanning process with the scanner 113, and the transmission process through the network I/F 208.

Figure 5:
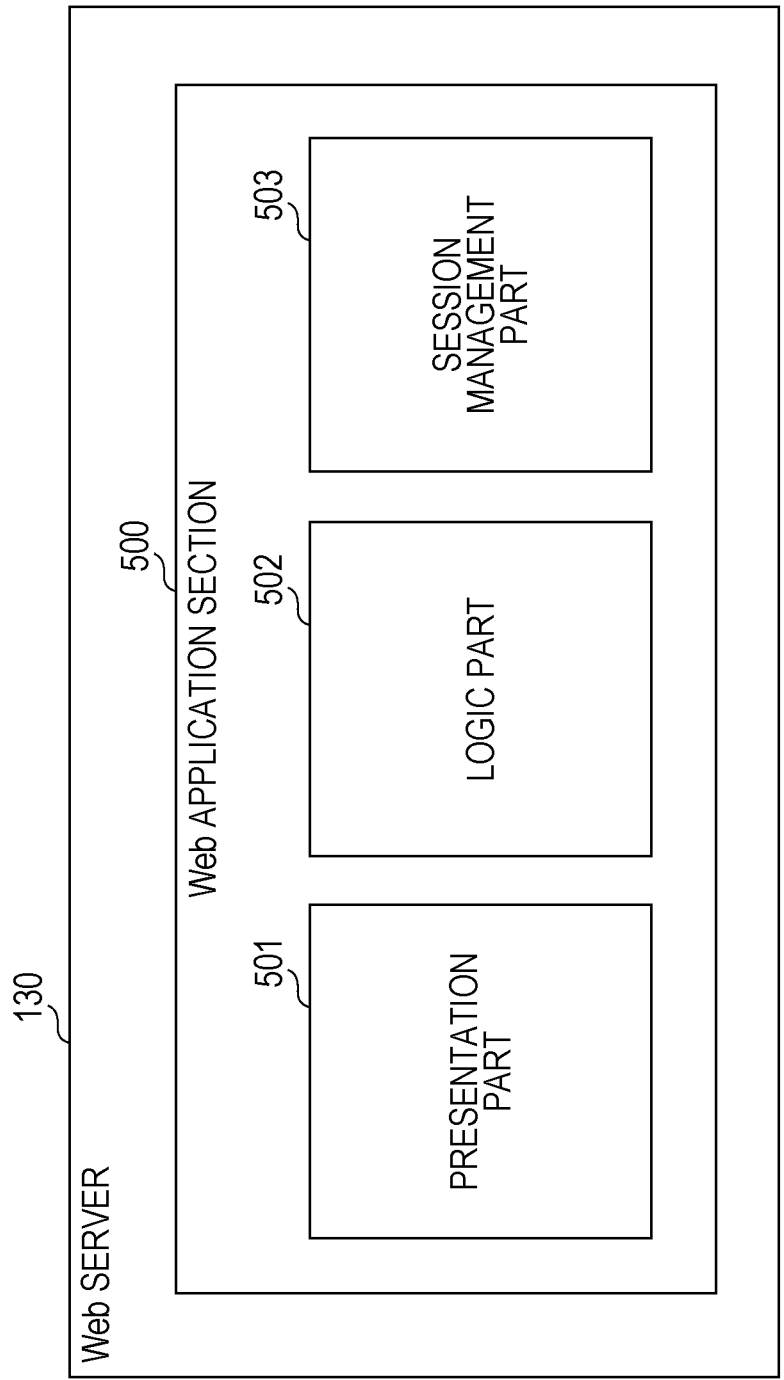
FIG. 5 shows the software configuration of the Web server.

Next, the functional configuration of a program executed by the Web server 130 will be described with reference to FIG. 5. FIG. 5 is a block diagram showing the functional configuration of the program decomposed in the RAM 302 in the Web server 130.

The Web server 130 includes the Web application section 500. The Web application section 500 includes the presentation part 501, a logic part 502, and a session management part 503.

The presentation part 501 performs a variety of processing by communication with the Web browser section 430 to provide an operation screen to be displayed in the operation unit 112 in the MFP 110. Specifically, the presentation part 501 receives an HTTP request corresponding to an instruction from the user from the Web browser section 430 to cause the logic part 502 to perform processing, if needed. In addition, the presentation part 501 generates an HTML file of the operation screen to be displayed in the Web browser section 430 in accordance with the HTTP request from the Web browser section 430 or the result of processing in the logic part 502 and transmits the generated HTML file to the Web browser section 430.

The logic part 502 generates a processing request to request a Web service from the MFP 110. Specifically, the logic part 502 performs a variety of processing in accordance with the HTTP request received by the presentation part 501 and generates a SOAP request to transmit the generated SOAP request to the service provider section 450 in the MFP 110. In addition, the logic part 502 transmits a URL corresponding to the screen to be displayed on the Web browser section 430 as a return URL upon completion of the service by the service provider section 450. The logic part 502 transmits the SOAP request to request, for example, the printing process by the printer 114, the scanning process by the scanner 113, or the transmission process through the network I/F 208.

The session management part 503 manages the state of the communication with the Web browser section 430 during the period from the time when the login request is submitted from the MFP 110 to the time when the logout request is submitted from the MFP 110 and session information used for temporarily storing data concerning the communication. In addition, the session management part 503 stores the authentication context received from the MFP 110 to refer to the stored authentication context in the transmission of the SOAP request to the MFP 110.

Figure 6:
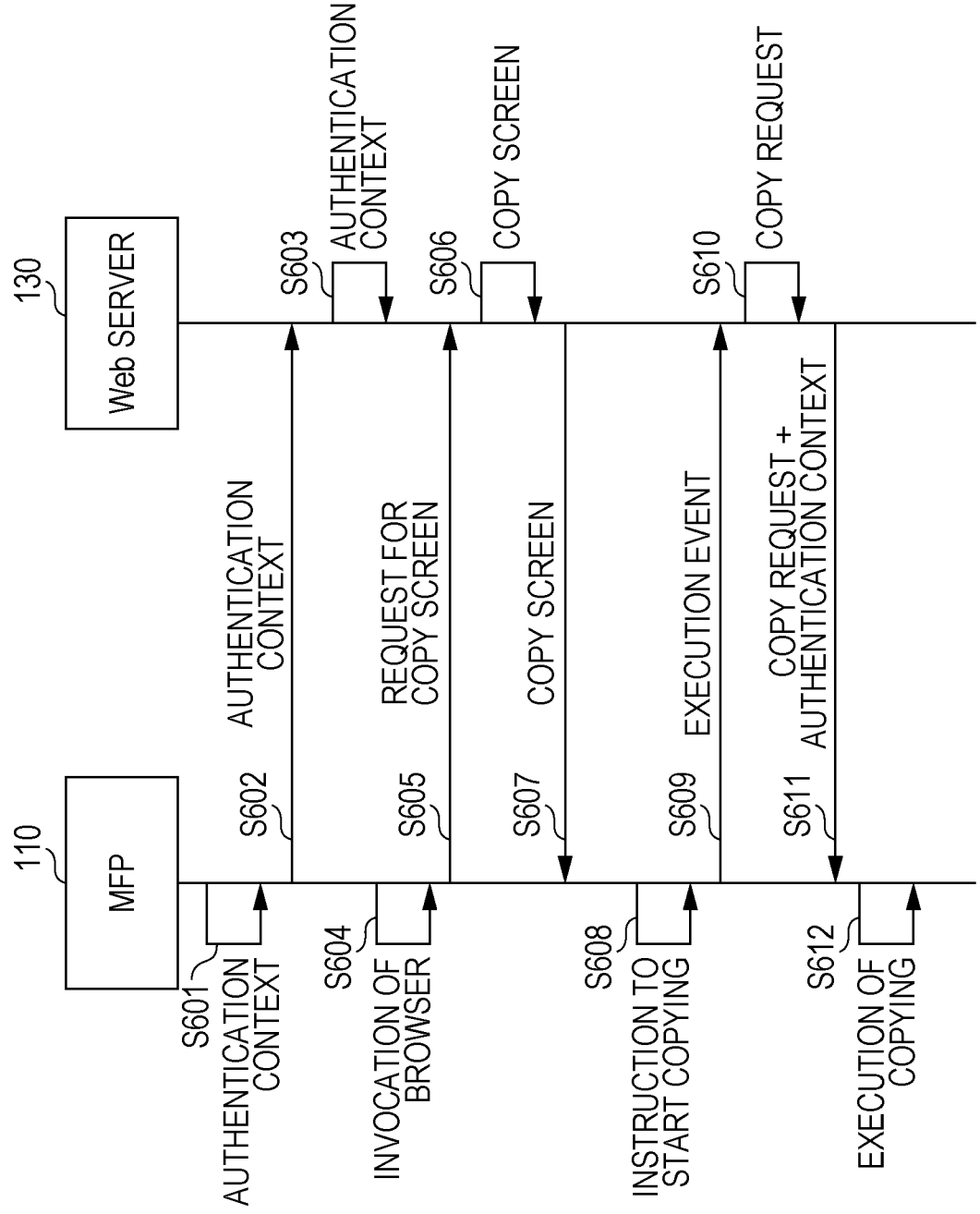
FIG. 6 is a sequence diagram showing a data flow between the MFP and the Web server.

Next, a process and a data flow between the MFP 110 and the Web server 130 will be described with reference to FIG. 6. An example in which the copy function of the MFP 110 is used to perform the copying will be described with reference to FIG. 6.

In Step S601 (notation of Step is hereinafter omitted), the login management section 410 performs the login process.

A login screen displayed in the operation unit 112 by the login screen display part 411 will now be described with reference to FIG. 7. Reference numeral 701 denotes a user name input field and reference numeral 702 denotes a password input field. Reference numeral 703 denotes a Login button. The user inputs his/her own user name and password in the user name input field 701 and the password input field 702, respectively, as the identification information. A domain name may be specified as the authentication information, in addition to the user name and the password. The user presses the Login button 703 after inputting the identification information to instruct the login. In response to the instruction from the user, the login management section 410 transmits the identification information input with the login screen to the authentication server 140 to request the result of the determination of the login. If the result received from the authentication server 140 shows that the user is an authorized user, it is determined that the user authentication succeeds and the functions of the MFP 110 can be used under the right of the user whose authentication succeeded.

If it is determined that the user authentication succeeds, the authentication context management section 420 generates the authentication context in response to the success of the user authentication. The authentication context management section 420 stores the generated authentication context in the RAM 202 and notifies the Web server 130 of the generated authentication context via the communication section 440.

An example of the authentication context generated by the authentication context management section 420 is described with reference to FIG. 8. An authentication context 801 has the following data structure.

An authentication server name 802 stores the name of an apparatus in which the user authentication is performed. A value identifying the server name of the authentication server 140 is stored in the authentication server name 802 here.

An IP address of authentication server 803 stores the IP address of the authentication server name 802. The IP address of the authentication server 140 is stored in the IP address of authentication server 803 here.

A security token 804 stores the result (security token) indicating that the authentication succeeds. The security token acquired from the authentication server 140 is stored in the security token 804 here.

A user name 805 stores the name of the login user. The user name is registered in the authentication server 140 in association with the user ID.

A user ID 806 stores the user ID input at the login.

A group name 807 stores the name of a group of the login user. The name of a group to which the user belongs, acquired from the authentication server 140, is stored in the group name 807.

A group ID 808 stores the group ID of the group acquired from the authentication server 140.

A domain name 809 stores the name of a domain to which the user belongs, acquired from the authentication server 140.

A mail address 810 stores the mail address of the user, acquired from the authentication server 140.

An access right 811 stores, for example, information indicating the operation right of the login user.

A valid period 812 stores a value specifying a certain period from the time when the login user has logged out from the MFP 110 to the time when the authentication context is deleted. When the certain period elapsed since the user has logged out from the MFP 110, the authentication context is automatically deleted by the authentication context management section 420. Since the authentication context is deleted in response to the fact that the certain period elapsed, it is possible to prevent the authentication context from being held in the MFP 110 after the user has logged out from the MFP 110.

Figure 8:
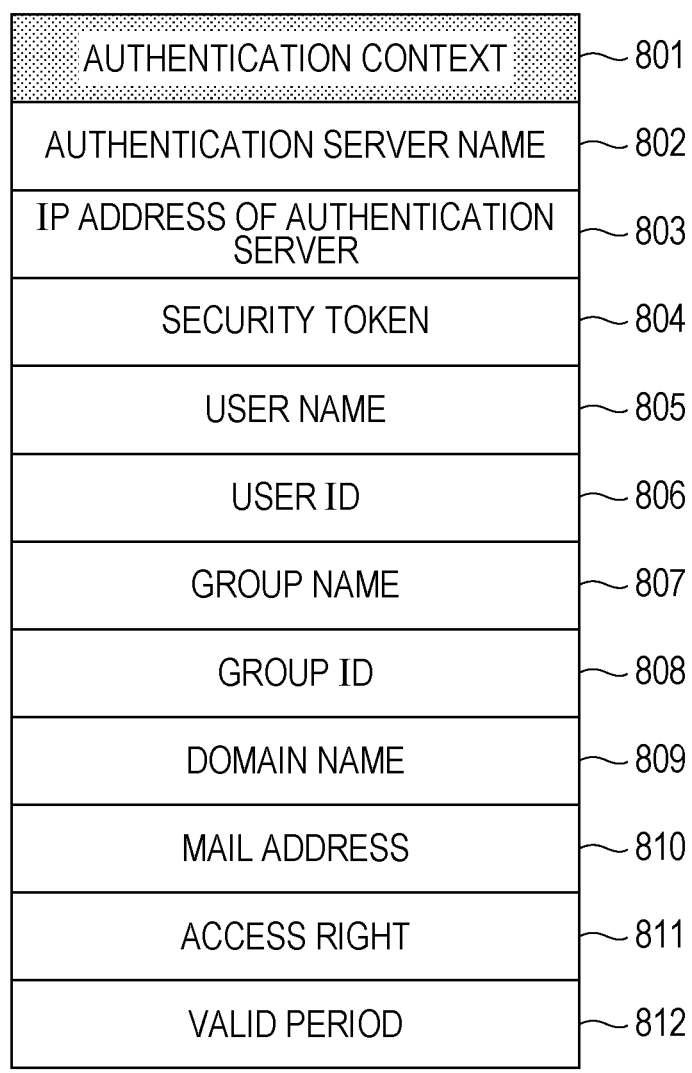
FIG. 8 shows the data structure of an authentication context.

The authentication context is not limited to the authentication context shown in FIG. 8 as long as the authentication context includes the information identifying the user who logs in the MFP 110. For example, the authentication context may be identification information that is input by the user on the login screen and that identifies the user.

The authentication context stored in the storage part 422 may include information that identifies the login state of the user. This information is used to determine whether the user currently logs in the MFP 110 or whether the user currently logs out from the MFP 110. In this case, the login management section 410 can determine the login state of the user on the basis of the information identifying the login state.

In S602, the communication section 440 transmits the authentication context generated by the authentication context management section 420 to the Web server 130. The authentication context may be generated by the authentication server 140 or the Web server 130, instead of being generated by the generator 421 in the authentication context management section 420. When the authentication server 140 generates the authentication context, the generated authentication context is transmitted to the MFP 110 and to the Web server 130. When the Web server 130 generates the authentication context, the Web server 130 itself has the function of the authentication server. In this case, the Web server 130 generates the authentication context in response to the fact that the user authentication succeeds and transmits the authentication context to the MFP 110.

In S603, the session management part 503 in the Web server 130 stores the authentication context transmitted from the communication section 440.

In S604, the login management section 410 instructs invocation of the Web browser section 430 in response to the fact that the user authentication succeeds. The invocation of the Web browser section 430 may be instructed by the user with the operation unit, instead of the login management section 410.

In S605, the Web browser section 430 submits a request to acquire a copy screen to be displayed in the operation unit 112 to the presentation part 501. The Web browser section 430 transmits an HTTP request in a GET method to the Web server 130 on the basis of URL information that is managed in the Web browser section 430 and that is initially displayed. Although the request to acquire the copy screen is exemplified here, a request to acquire a screen other than the copy screen may be submitted. For example, a request to acquire a selection screen on which the copy function, the scanning function, the transmission function, or the like is selected or a request to acquire a menu screen may be submitted. In addition, the authentication context transmitted in S602 may be transmitted to the Web server 130 along with the request to acquire the copy screen. In this case, S602 may be omitted.

In S606, the presentation part 501 generates or acquires an HTML file causing the Web browser section 430 to display the copy screen on the basis of the HTTP request transmitted from the Web browser section 430.

In S607, the presentation part 501 transmits the generated HTML file from the Web server 130 to the MFP 110.

In S608, the analyzer 432 in the MFP 110 analyzes the HTML file received from the Web server 130 via the communication section 440 and the operation screen display part 431 displays the copy screen in the operation unit 112. The event processor 433 accepts an execution event through the displayed copy screen.

Figure 9:
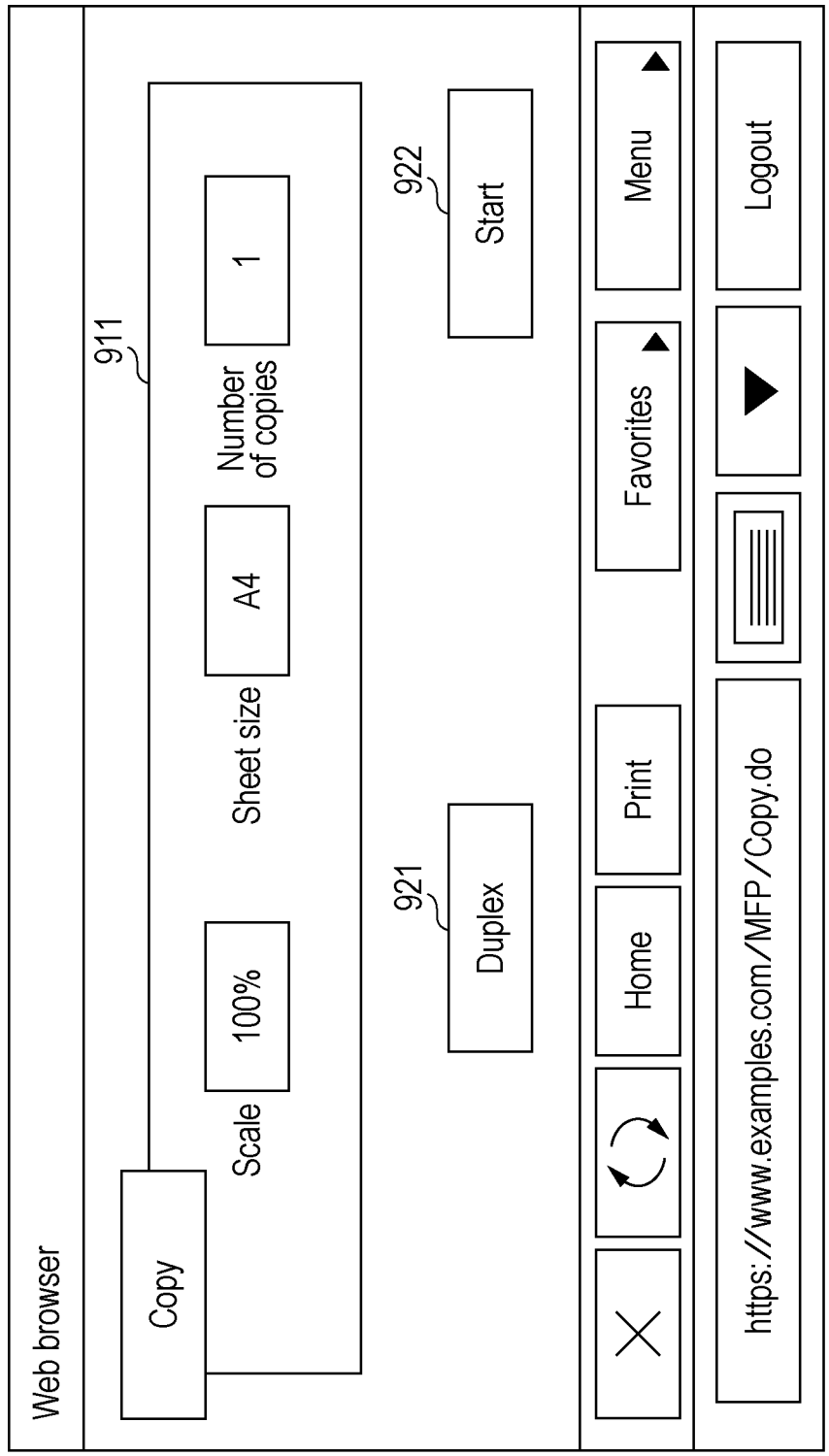
FIG. 9 shows a copy screen displayed by a Web browser section.

FIG. 9 shows a copy screen displayed in the operation unit 112 by the operation screen display part 431. The copy screen in FIG. 9 is a basic screen used for the copy operation. A setup button 911 is used to set print conditions including the scale of the copying, the sheet size, and the number of copies. A Duplex button 921 is used to set a print condition indicating whether the duplex copying is performed. A Start button 922 is used to instruct execution of the copying on the basis of the set print conditions. In response to the Start button 922 that is pressed, the Web browser section 430 transmits operation information generated in accordance with the set conditions to the Web server 130 along with the instruction to execute the copying (execution event).

In S609, the event processor 433 transmits the execution event instructed by the user on the copy screen in FIG. 9 to the presentation part 501 via the communication section 440.

In S610, the presentation part 501 instructs the logic part 502 to generate a message requesting the execution of the copying. The logic part 502 generates a SOAP request in accordance with the instruction from the presentation part 501. A message to execute a copy Web service is described in the SOAP request in an Extensible Markup language (XML) format.

In S611, the logic part 502 transmits the generated SOAP request to the service provider section 450 in the MFP 110. In addition, the logic part 502 acquires the authentication context managed in the session management part 503 and transmits the acquired authentication context to the authentication context management section 420 along with the SOAP request.

In S612, the authentication context management section 420 compares the authentication context stored in the authentication context management section 420 with the authentication context stored in the session management part 503 and, if the authentication context stored in the authentication context management section 420 coincides with the authentication context stored in the session management part 503, permits the execution of the copy service. The service provider section 450 instructs the job execution section to execute the copy job in accordance with the SOAP request message generated by the logic part 502. Specifically, the service provider section 450 analyzes the SOAP request message to execute the copying in accordance with the SOAP request message.

Figure 10:
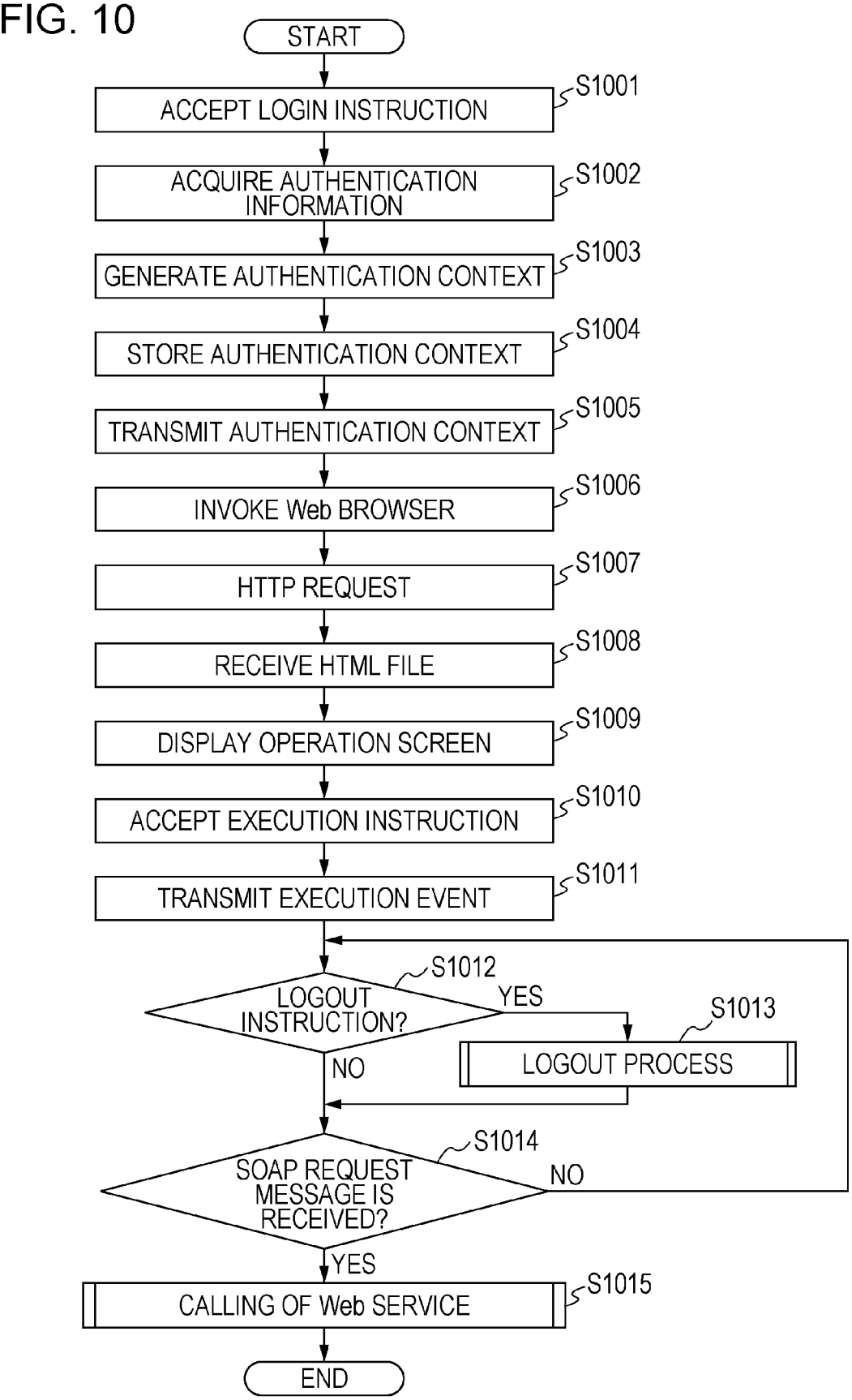
FIG. 10 is a flowchart showing a process of the entire MFP.

Next, a process performed by the MFP 110 will be described with reference to a flowchart in FIG. 10. Each operation shown in the flowchart in FIG. 10 is realized by the CPU 201 that executes the program stored in the ROM 203. The flowchart in FIG. 10 is started in response to pressing of the ID key included in the operation unit 112 in the MFP 110 by the user.

In S1001, the login management section 410 accepts a login instruction from the user. Specifically, the login screen display part 411 displays the login screen in FIG. 7 to wait for input of the identification information, such as the user ID, by the user.

Figure 7:
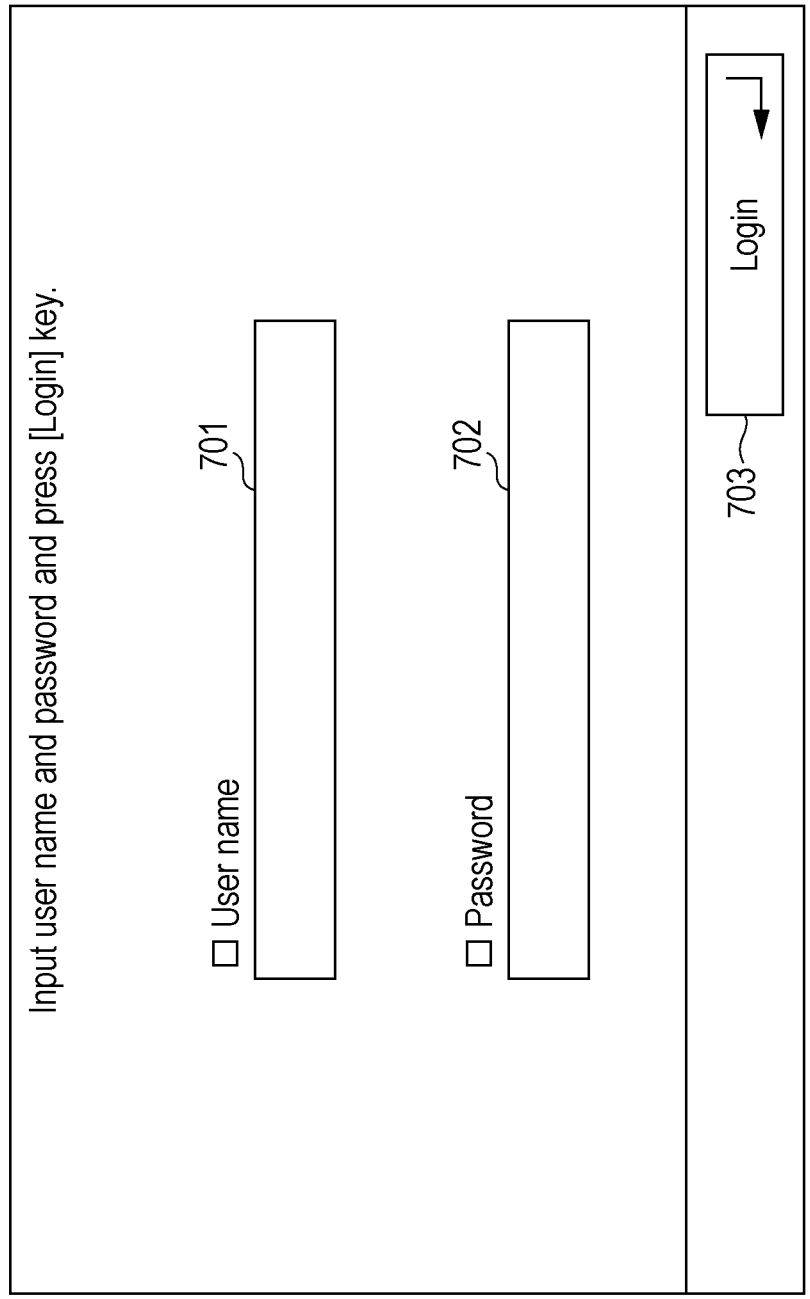
FIG. 7 shows a login screen displayed by a login management section.

In S1002, the authenticator 412 acquires the identification information input by the user on the login screen in FIG. 7 and inquires of the authentication server 140 about the user authentication to perform the user authentication.

In S1003, the generator 421 in the authentication context management section 420 generates the authentication context on the basis of the identification information input by the user.

In S1004, the storage part 422 in the authentication context management section 420 stores the authentication context generated by the generator 421 in the RAM 202.

In S1005, the communication section 440 transmits the authentication context stored in the storage part 422 to the Web server 130.

In S1006, the login management section 410 invokes the Web browser section 430.

In S1007, the communication section 440 submits an HTTP request to the presentation part 501 in order to display the operation screen. The communication section 440 transmits the HTTP request in the GET method to the Web server 130 on the basis of the URL information that is managed in the Web browser section 430 and that is initially displayed.

In S1008, the communication section 440 receives an HTML file from the presentation part 501. Screen information used to display the copy screen is described in the HTML file.

In S1009, the analyzer 432 analyzes the HTML file and the operation screen display part 431 displays the copy screen in FIG. 9 in the operation unit 112.

In S1010, the event processor 433 generates an execution event to be transmitted to the Web application section 500 in accordance with the content of the button that is operated. Specifically, the event processor 433 generates an execution event based on the content set with the setup button 911 in response to the pressing of the Start button 922.

The steps from S1007 to S1009 may be repeated multiple times until the Start button 922 is pressed in S1010. In this case, the HTTP request to display the operation screen and the response to the request are transmitted between the Web browser section 430 and the presentation part 501 multiple times.

In S1011, the communication section 440 transmits the execution event generated in the event processing to the Web server 130. If the logout is instructed before S1011, the authentication context management section 420 deletes the authentication context and returns to the login screen.

In S1012, the login management section 410 determines whether a logout instruction is issued from the user. The login management section 410 detects whether the ID key in the operation unit 112 is pressed by the user. If the ID key is pressed, the process goes to S1013. If the ID key is not pressed, the process goes to S1014.

In S1013, the login management section 410 performs a process concerning the logout. The process concerning the logout corresponds to a process to save the authentication context from the RAM 202 to the HDD 204 or a process to inhibit the logout. The process concerning the logout will be described in detail below with reference to a flowchart in FIG. 11.

In S1014, the processing acceptor 451 in the service provider section 450 determines whether a SOAP request is received from the Web server 130. If no SOAP request is received, the process goes back to S1012. If a SOAP request is received, the process goes to S1015.

In S1015, a Web service is called on the basis of the request for the copy process described in the SOAP request message. Specifically, the job generator 452 generates the copy job in response to the SOAP request and the job execution section 460 executes the copy process.

Figure 11:
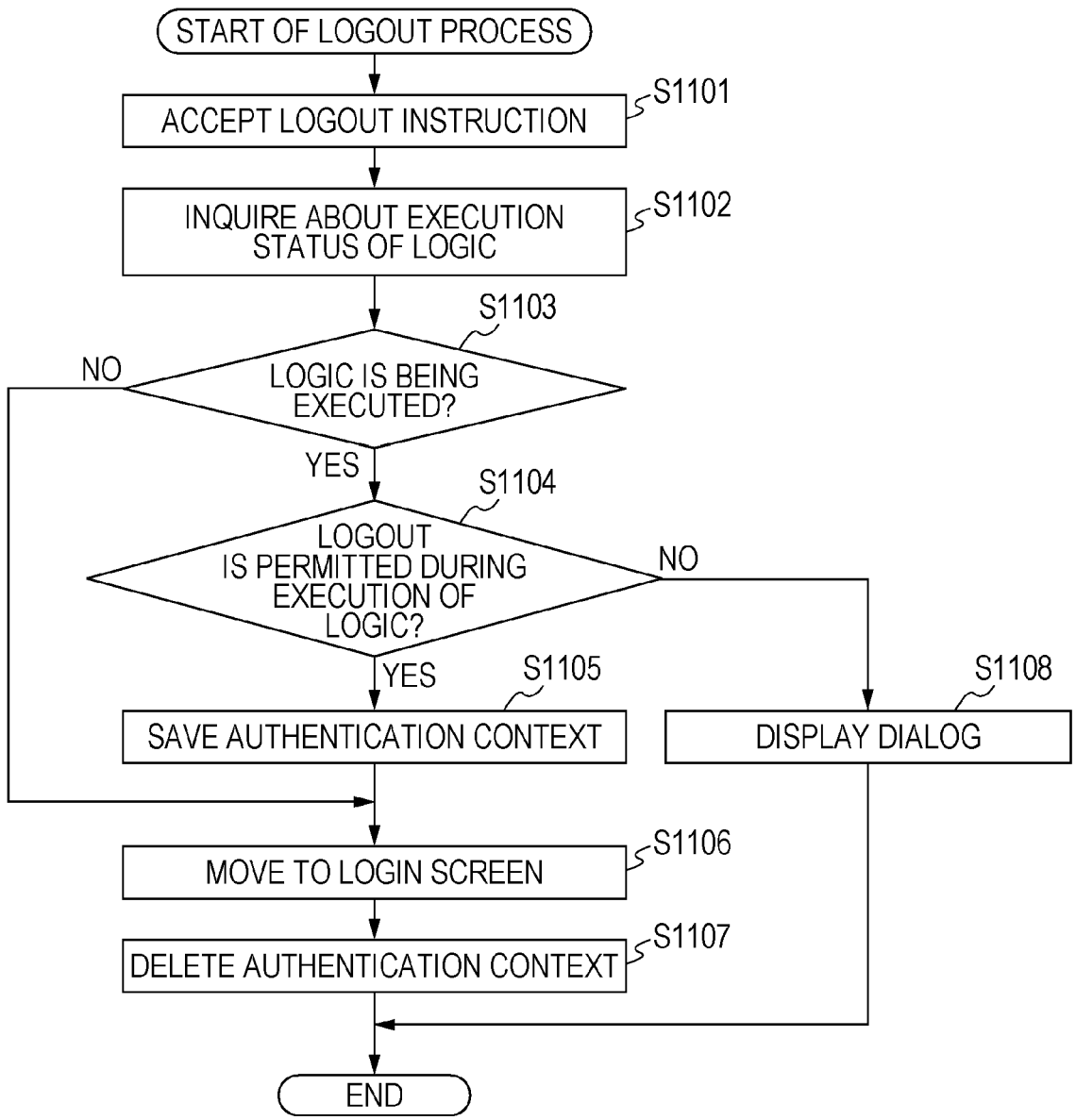
FIG. 11 is a flowchart showing a process concerning logout.

Next, the process concerning the logout in the MFP 110 will be described with reference to FIG. 11. FIG. 11 is a flowchart showing the logout process in S1013 in FIG. 10 in detail.

In S1101, the login management section 410 detects that the user presses the ID key in the operation unit 112 and accepts the logout instruction. Instead of the ID key, the login management section 410 may detect that a Logout button on the operation screen displayed by the Web browser section 430 is pressed.

In S1102, the login management section 410 inquires of the Web server 130 about the processing status of the logic in the logic part 502 via the Web browser section 430. Specifically, the login management section 410 inquires whether the logic part 502 is being generating a SOAP request by using an HTTP request. The Web browser section 430 receives the result of the processing status of the logic in the logic part 502 as an HTTP response. The HTTP response that is received may include information notifying the MFP 110 of inhibition of execution of the logout process from the MFP during the processing of the logic, in addition to the processing status of the logic. The inhibition of the execution of the logout process is notified to the MFP to prevent the logout process from being performed at the side of the MFP 110 during the processing at the side of the Web server 130. In other words, since the authentication context is held without being deleted, the authentication context received with the SOAP request is compared with the authentication context stored in the MFP 110 to determine whether the user is the login user. As a result, the image processing can be appropriately performed.

In S1103, the Web browser section 430 interprets the received HTTP response to determine whether the logic is being executed in the Web server 130. Specifically, the Web browser section 430 determines whether a SOAP request message is being generated in the logic part 502. The Web browser section 430 makes the determination on the basis of information corresponding to the content of the HTTP response received in S1102. In addition, the Web browser section 430 displays information indicating that the logic is being executed in the Web server 130 in the operation unit 112. If the Web browser section 430 determines that the logic is being executed in the logic part 502, the process goes to S1104. If the Web browser section 430 determines that the logic is completed in the Web server 130 or if the generation of the SOAP request is suspended due to, for example, an error at the side of the Web server 130, the process goes to S1106.

In S1104, the Web browser section 430 determines whether the logout from the MFP by the user is permitted during the execution of the logic in the logic part 502. In this step, the determination may be made on the basis of the information indicating the inhibition of the logout process during the execution of the logic, in the HTTP response received in S1102. If the logout is permitted, the process goes to S1105. If the logout is inhibited, the process goes to S1108.

In S1105, the Web browser section 430 saves the authentication context. In other words, the Web browser section 430 duplicates the authentication context held in the RAM 202 in the HDD 204.

In S1106, the login management section 410 executes the logout process. The operation screen displayed by the Web browser section 430 is moved to the login screen in FIG. 7. Accordingly, the operation by the user on the operation screen displayed by the Web browser section 430 is restricted. The login management section 410 may be caused to display a screen indicating that the logout is completed.

In S1107, the authentication context management section 420 deletes the authentication context stored in the RAM 202. The authentication context saved in the HDD 204 is not deleted.

If the information indicating the inhibition of the logout process during the execution of the logic is included in the HTTP response received in S1102, then in S1108, a dialog indicating that the logout is restricted is displayed in the operation unit 112 in order to inhibit the logout and the logout is inhibited. If the user instructs the logout, the execution status in the logic part 502 is indicated to the MFP. If the logic in the logic part 502 is being executed, the fact that the logic in the logic part 502 is being executed is indicated to prevent the authentication context from being deleted. The logout is inhibited to prevent the logout before the copy process is completed.

Although the Web browser section 430 saves the authentication context in the HDD 204 if the logic is being executed at the side of the Web server 130 in S1103, the authentication context after the logout may be stored in the HDD 204 regardless of whether the logic is being executed. In this case, it is desirable that the valid period be set for the authentication context stored in the HDD 204. When the valid period elapsed, the authentication context stored in the HDD 204 is deleted by the CPU 201.

In addition, the setting of the valid period for the authentication context can prevent the authentication context from being held in the MFP 110 if no processing request from the user who has logged out is received due to, for example, an error at the side of the Web server 130.

Instead of saving the authentication context in the HDD 204 in S1105, the authentication context may be saved in the RAM 202. In this case, it is necessary for the authentication context management section 420 to hold the authentication context of the user who logs in and the authentication context of the user who has logged out (the saved authentication context) such that the authentication context of the user who logs in can be distinguished from the authentication context of the user who has logged out.

Figure 12:
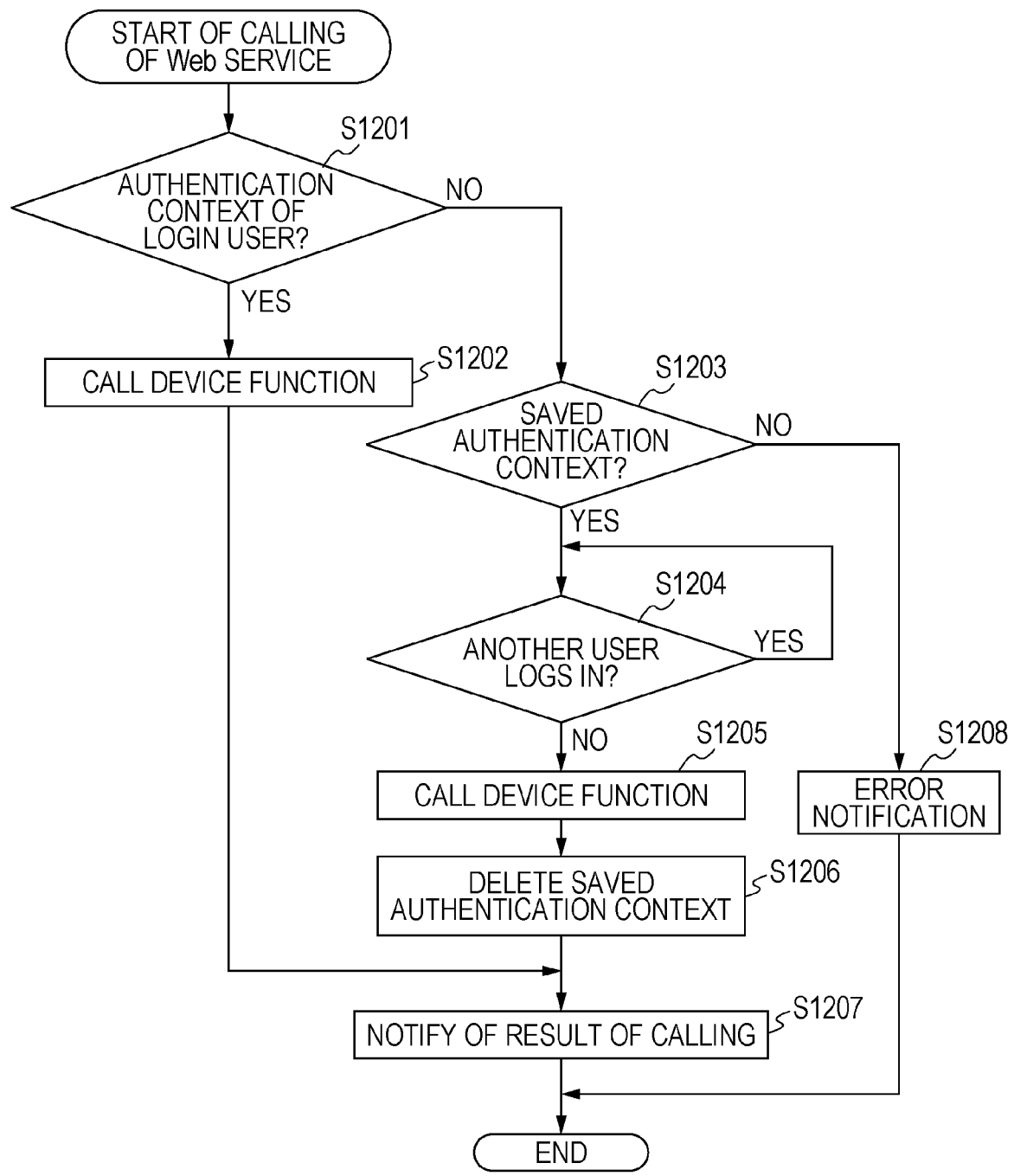
FIG. 12 is a flowchart showing a process of executing a Web service.

An execution flow of a Web service will now be described with reference to FIG. 12. FIG. 12 is a flowchart showing S1015 in FIG. 10 in detail.

In S1201, the authentication context management section 420 determines whether the SOAP request received from the Web server is the processing request corresponding to the operation of the login user. Specifically, the authentication context management section 420 determines whether the authentication context embedded in the header of the received SOAP request coincides with the authentication context held in the RAM 202 by the authentication context management section 420. If the authentication context management section 420 determines that the authentication context embedded in the header of the received SOAP request coincides with the authentication context held in the RAM 202 by the authentication context management section 420, the process goes to S1202. If the authentication context management section 420 determines that the authentication context embedded in the header of the received SOAP request does not coincide with the authentication context held in the RAM 202 by the authentication context management section 420, the process goes to S1203.

The determination in S1201 may be based on whether the user logs in the MFP 110 or logs out from the MFP 110. In this case, the login management section 410 determines the login state on the basis of the authentication context stored in the storage part 422 in the authentication context management section 420.

In S1202, the service provider section 450 calls a Web service in accordance with the right in the authentication context. Specifically, the job generator 452 generates a copy job on the basis of the SOAP request message. The job execution section 460 executes the printing process with the printer 114 on the basis of the copy job generated by the job generator 452.

In S1203, the authentication context management section 420 performs comparison with the authentication context saved in the HDD 204. If the authentication context of the user who has logged out is stored in the HDD 204 and the authentication context stored in the HDD 204 coincides with the authentication context received from the Web server 130, the process goes to S1204. If no authentication context of the user who has logged out is stored in the HDD 204 or if the authentication context stored in the HDD 204 does not coincide with the authentication context received from the Web server 130, the process goes to S1208.

In S1204, the authentication context management section 420 determines whether another user logs in the MFP 110, that is, whether the authentication context of another user is managed. If the determination shows that another user is logs in, it is determined that the other user has logged into the MFP 110 during a period from S1011 to S1014 in FIG. 10. The processing is suspended until the authentication context management section 420 deletes the authentication context of the other user. During the suspension of the processing, the other user performs an operation and the completion of the processing for the operation is waited for. If another user does not log in or if the authentication context of the other user is deleted from the RAM 202, the process goes to S1205.

In S1205, the service provider section 450 is caused to call a Web service in accordance with the right of the saved authentication context. This step is similar to S1202.

In S1206, the authentication context management section 420 deletes the authentication context stored in the HDD 204. In other words, the authentication context is deleted in response to the completion of the execution of the processing corresponding to the processing request from the Web server 130. This prevents the authentication context from being held in the MFP 110 after the user logs out from the MFP 110. As a result, it is possible to prevent, for example, personal information included in the authentication context from remaining in the MFP 110. Alternatively, the authentication context management section 420 may delete the authentication context when a certain period specified by the valid period 812 in FIG. 8 elapsed.

In S1207, the Web browser section 430 notifies the Web server 130 of the result of the calling of the Web service and displays an execution completion screen in the operation unit 112, if required. Then, the process in the flowchart is terminated.

In S1208, the authentication context management section 420 notifies the Web server 130 of an authentication error. Then, the process in the flowchart is terminated.

According to the present embodiment, the authentication context is not deleted from the MFP 110 and is held therein even after the user instructs the logout from the MFP 110. Accordingly, it is possible for the user to log out during the execution of the logic in the Web server 130. As a result, even after the user instructs the logout from the MFP 110, the calling of a Web service from the Web server 130 can be appropriately performed.

When another user logs in the MFP 110 after the user logs out from the MFP 110 in S1204, priority is given to the processing by the other user. This allows the calling of a Web service to be appropriately performed for the user who has logged out even in the state in which another user logs in. As a result, it is possible to prevent a specific user from occupying the MFP 110 in order to wait for the completion of the execution of a device function.

Second Embodiment

Next, a second embodiment of the present invention will be described. A case in which the user instructs the logout before a SOAP request to request the printing is received since a SOAP request to request the scanning has been received will be described in the second embodiment. The system configuration and the hardware configuration of each apparatus in the second embodiment are similar to those in the first embodiment.

Figure 13:
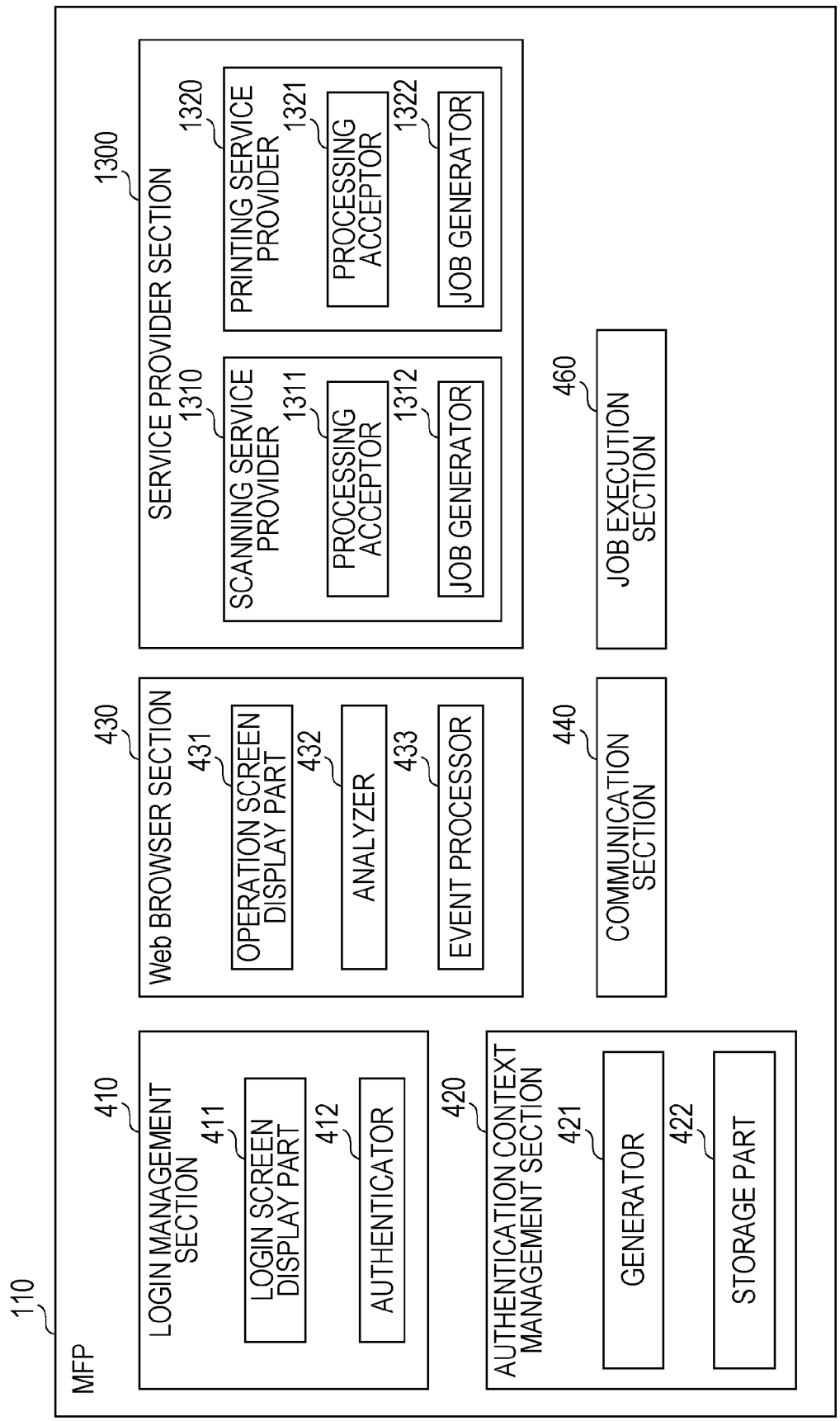
FIG. 13 shows the software configuration of an MFP according to a second embodiment.

The functional configuration of a program executed in the MFP 110 will now be described with reference to FIG. 13.

The service provider section 450 includes a scanning service provider 1310 that performs the scanning with the scanner 113 and a printing service provider 1320 that performs the printing process with the printer 114.

The scanning service provider 1310 includes a processing acceptor 1311 and a job generator 1312. The processing acceptor 1311 receives a SOAP request to request the scanning process from the Web server 130 and passes the SOAP request to the job generator 1312. The job generator 1312 generates a scanning job on the basis of the received SOAP request and instructs the job execution section to execute the scanning job.

The printing service provider 1320 includes a processing acceptor 1321 and a job generator 1322. The processing acceptor 1321 receives a SOAP request to request the printing process from the Web server 130 and passes the SOAP request to the job generator 1322. The job generator 1322 generates a printing job on the basis of the received SOAP request and instructs the job execution section 460 to execute the printing job.

The remaining functional configuration of the program in the MFP 110 is similar to the one shown in FIG. 4. The functional configuration of a program in the Web server 130 is similar to the one shown in FIG. 5.

Figure 14:
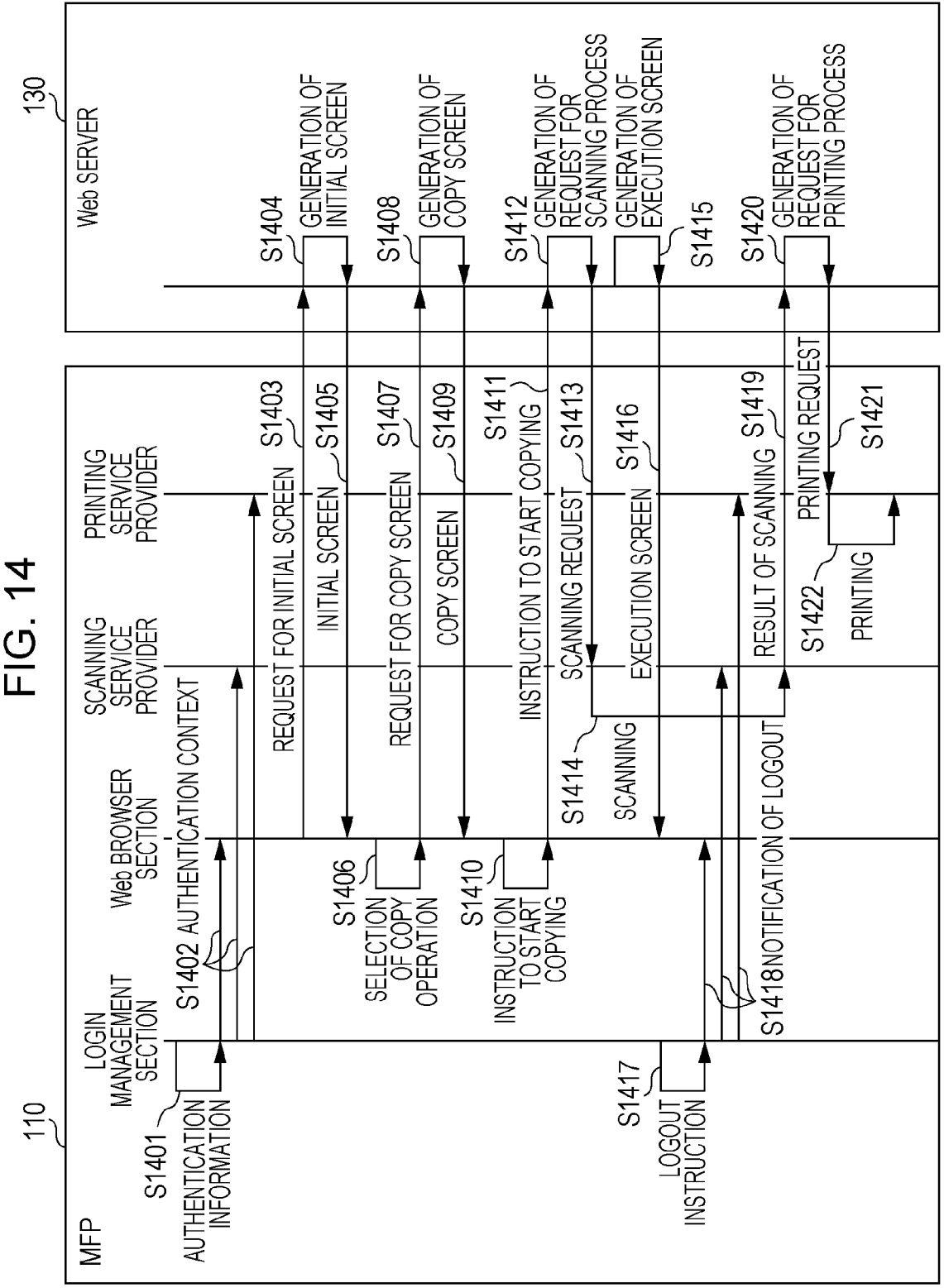
FIG. 14 is a sequence diagram showing a data flow between the MFP and the Web server according to the second embodiment.

FIG. 14 is a sequence diagram of a copy process using the MFP 110 and the Web server 130.

First, the user instructs the MFP 110 of the login with the operation unit 112. In S1401, the login management section 410 displays the login screen in FIG. 7 in the operation unit 112 and prompts the user to input the user ID. The user inputs the user name and the password on the login screen in FIG. 7 to perform the login operation.

In S1402, the login management section 410 performs a user authentication process. If the user authentication succeeds, the login management section 410 notifies the Web browser section 430, the scanning service provider 1310, and the printing service provider 1320 of the authentication context. Although the authentication context management section 420 stores the authentication context in the first embodiment, the authentication context is indicated to each module in the second embodiment.

In S1403, the Web browser section 430 requests a menu screen from the Web server 130, which is the connection target that is set. In S1404, the Web server 130 generates menu screen information in response to the request for the operation screen. In S1405, the Web server 130 transmits the generated screen information (HTML file) to the MFP 110. The Web browser section 430 receives the menu screen information and displays a menu screen in FIG. 15 in the operation unit 112 in the MFP 110. The menu screen in FIG. 15 includes a Copy button 1511, a Send button 1512, and a Print button 1513 used to instruct the execution of the functions of the MFP 110. The menu screen in FIG. 15 also includes a Logout button 1502. Since the execution event is not transmitted to the Web server 130 when the Logout button 1502 is pressed, the saving of the authentication context is not performed and the logout process by the login management section 410 is performed.

In S1406, the Web browser section 430 selects a copy operation on the basis of the instruction input by the user with the operation unit 112. The user presses the Copy button 1511 in FIG. 15. In S1407, the Web browser section 430 determines the instruction by the user and notifies the Web server 130 of the selection of the copy process. In S1408, the Web server 130 generates screen information used for displaying the copy screen in response to the request for the selection of the copy process. Then, the Web server 130 transmits the generated screen information about the copy screen to the MFP 110. In S1409, the Web browser section 430 receives the copy screen information and displays the copy screen in FIG. 9 in the operation unit 112.

In S1410, the Web browser section 430 displays the setup button 911, the Duplex button 921, and the Start button 922 to accept the settings of the printing conditions and the operation to start the copying. When the user presses the Start button 922, in S1411, the Web browser section 430 determines the instruction by the user and notifies the Web server 130 of a copy process execution event.

In S1412, the Web server 130 divides the copy process into the scanning process and the printing process in accordance with the notification of the copy process execution event and executes the scanning process and the printing process. First, the Web server 130 prepares for the scanning process. Specifically, the logic part 502 generates a SOAP request to request the scanning process. In S1413, the Web server 130 transmits the SOAP request to perform the scanning process to the scanning service provider 1310 in the MFP 110. In the communication of the request for the scanning process, the authentication context generated in the user authentication is also transmitted, in addition to the scanning settings and the destination of the scanning information.

The scanning service provider 1310 performs the following step. In S1414, the scanning service provider 1310 determines whether the authentication context acquired through the Web server 130 coincides with the authentication context acquired from the login management section 410. If the determination shows that the authentication context acquired through the Web server 130 coincides with the authentication context acquired from the login management section 410, the scanning service provider 1310 performs the scanning process in accordance with the scanning setting parameters included in the SOAP request.

In S1415, in the Web server 130, the presentation part 501 generates screen information indicating that the copying is being performed, concurrently with the generation of a SOAP request by the logic part 502. In S1416, the Web server 130 transmits the screen information about the generated copying screen to the Web browser section 430. The Web browser section 430 receives the screen information about the copying screen and displays a copying screen in FIG. 16 in the operation unit 112.

In S1417, the login management section 410 accepts the instruction of the logout from the user when the scanning process is started by the scanner 113 and the copying screen in FIG. 16 is displayed. Specifically, the login management section 410 accepts pressing of a Logout button 1602 in FIG. 16 by using the operation unit 112 in the MFP 110.

In S1418, the login management section 410 determines the instruction by the user and performs the logout process. Specifically, the login management section 410 notifies each module that the authentication context is invalid. Then, the login management section 410 displays the login screen in FIG. 7 in the operation unit 112.

In S1419, the scanning service provider 1310, which is concurrently operated by the controller unit 111, transmits the result of the scanning to the Web server 130 when the scanning process completed. The result of scanning includes image data scanned by the scanner 113.

In S1420, the Web server 130, which receives the result of scanning, performs the image processing for the printing to the image data resulting from the scanning. For example, the Web server 130 performs the image processing to embed a copy-forgery-inhibited pattern for preventing an original document from being copied in print data. When the image processing is completed, in S1421, the Web server 130 transmits a SOAP request to request the printing process to the printing service provider 1320.

In S1422, the printing service provider 1320, which receives the SOAP request concerning the print request, refers to the available authentication context. Although the logout process is performed before the SOAP request is received, the saved authentication context is held in the HDD 204. The printing service provider 1320 compares the available authentication context with the authentication context held in the HDD 204 and the request for the printing is permitted. The actual data is printed out with the printer 114.

According to the second embodiment, it is possible to appropriately execute the copy function of the MFP if the user instructs the logout before the request for the printing process is received since the request for the scanning process has been received.

Other Embodiments

The present invention is also realized by performing the following process. Specifically, software (a program) realizing the functions of the embodiments described above may be supplied to a system or an apparatus via a network or any of various storage media. The computer (or the CPU or a micro processing unit (MPU)) in the system or the apparatus may read out the program to execute the readout program.

According to the present invention, it is possible to continue the image processing instructed before logout even if the user instructs the logout from the image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/069292, filed Nov. 12, 2009, which is hereby incorporated by reference herein in its entirety.

The invention claimed is:

1. An image processing apparatus for communicating with an external apparatus, the image processing apparatus comprising:
   a storage unit configured to store first authentication information about a user who logs in to the image processing apparatus;
   an accepting unit configured to accept an instruction from the user;
   a notifying unit configured to notify the external apparatus of the accepted instruction;
   a reception unit configured to receive a processing request generated on a basis of the notified instruction from the external apparatus with second authentication information;
   a determination unit configured to determine whether the stored first authentication information coincides with the received second authentication information;
   a process unit configured to execute image processing in accordance with the processing request received by the reception unit if the determination unit determines that the first authentication information coincides with the second authentication information; and
   a control unit configured not to delete the first authentication information from the storage unit if the user has logged out from the image processing apparatus before the determination unit determines that the first authentication information coincides with the second authentication information and to delete the first authentication information from the storage unit if the user has logged out from the image processing apparatus and the determination unit determines that the first authentication information coincides with the second authentication information.

2. The image processing apparatus according to claim 1, further comprising:
   an input unit configured to input identification information for identifying the user;
   an authenticating unit configured to authenticate the user on a basis of the identification information input by the input unit; and
   a generating unit configured to generate the first authentication information in response to the authentication of the user by the authenticating unit,
   wherein the storage unit stores the first authentication information generated by the generating unit.

3. The image processing apparatus according to claim 1, wherein the image processing apparatus is configured to communicate with an authentication apparatus that authenticates the user, the image processing apparatus further comprising:
   an input unit configured to input identification information for identifying the user; and
   an acquiring unit configured to acquire the first authentication information in response to the user authentication by the authentication apparatus based on the identification information input by the input unit,
wherein the storage unit stores the first authentication information acquired by the acquiring unit.

4. The image processing apparatus according to claim 3, wherein the authentication information acquired by the acquiring unit includes the identification information input by the input unit.

5. The image processing apparatus according to claim 1, further comprising a second determination unit configured to determine whether another user logs in to the image processing apparatus,
wherein, if the second determination unit determines that the another user logs in to the image processing apparatus, the control unit restricts the process unit executing the image processing in response to the received processing request based on the accepted instruction notified by the notifying unit until the another user logs out from the image processing apparatus.

6. The image processing apparatus according to claim 1,
wherein the process unit executes the image process as a Web service, and
wherein the processing request received by the reception unit is a request for the Web service.

7. The image processing apparatus according to claim 1, wherein the process unit executes at least one of copying, scanning, and printing in response to a request for a Web service.

8. An image processing apparatus for communicating with an external apparatus, the image processing apparatus comprising:
a storage unit configured to store first authentication information about a user who logs in to the image processing apparatus;
an accepting unit configured to accept an instruction from the user;
a notifying unit configured to notify the external apparatus of the accepted instruction;
a reception unit configured to receive a processing request generated on a basis of the notified instruction from the external apparatus with second authentication information;
a process unit configured to execute image processing in response to the processing request received by the reception unit;
a first control unit configured to permit execution of the image processing in accordance with the received processing request if the reception unit receives the processing request based on the instruction accepted from the user who logs in to the image processing apparatus; and
a second control unit configured to restrict the user logging out from the image processing apparatus at least before the processing request is received by the reception unit since the instruction has been notified by the notifying unit.

9. The image processing apparatus according to claim 8, further comprising an inquiring unit configured to inquire of the external apparatus whether a process to generate the processing request is being performed in the external apparatus,
wherein the second control unit restricts the user logging out from the image processing apparatus if a response to the inquiry by the inquiring unit shows that the process to generate the processing request is being performed.

10. The image processing apparatus according to claim 8, wherein the second control unit causes a display unit to display information indicating inhibition of a logout of the user.

11. A method of controlling an image processing apparatus for communicating with an external apparatus, the method comprising:
storing, in a storage unit, first authentication information about a user who logs in to the image processing apparatus;
accepting an instruction from the user
notifying the external apparatus of the accepted instruction;
receiving a processing request generated on a basis of the notified instruction from the external apparatus with second authentication information;
determining whether the stored first authentication information coincides with the received second authentication information;
executing image processing in accordance with the received processing request if it is determined that the first authentication information coincides with the second authentication information; and
causing the first authentication information not to be deleted from the storage unit if the user has logged out from the image processing apparatus before it is determined that the first authentication information coincides with the second authentication information and causing the first authentication information to be deleted from the storage unit if the user has logged out from the image processing apparatus and it is determined that the first authentication information coincides with the second authentication information.

12. A method of controlling an image processing apparatus for communicating with an external apparatus, the method comprising:
storing, in a storage unit, first authentication information about a user who logs in to the image processing apparatus;
accepting an instruction from the user;
notifying the external apparatus of the accepted instruction;
receiving a processing request generated on a basis of the notified instruction from the external apparatus with second authentication information;
executing image processing in response to the received processing request;
permitting execution of the image processing in accordance with the received processing request if the processing request is received based on the instruction accepted from the user who logs in to the image processing apparatus; and
restricting the user logging out from the image processing apparatus at least before the processing request is received since the instruction has been notified.

13. A non-transitory computer readable storage medium encoded with a computer program, that when executed by a computer in an image processing apparatus causes the image processing apparatus to perform a control method, the control method comprising:
storing, in a storage unit, first authentication information about a user who logs in to the image processing apparatus;
accepting an instruction from the user;
notifying an external apparatus of the accepted instruction;
receiving a processing request generated on a basis of the notified instruction from the external apparatus with second authentication information;
determining whether the stored first authentication information coincides with the received second authentication information;

executing image processing in accordance with the received processing request if it is determined that the first authentication information coincides with the second authentication information; and causing the first authentication information not to be deleted from the storage unit if the user has logged out from the image processing apparatus before it is determined that the first authentication information coincides with the second authentication information and causing the first authentication information to be deleted from the storage unit if the user has logged out from the image processing apparatus and it is determined that the first authentication information coincides with the second authentication information.

14. A non-transitory computer readable storage medium encoded with a computer program, that when executed by a computer in an image processing apparatus causes the image processing apparatus to perform a control method, the control method comprising:

storing, in a storage unit, first authentication information about a user who logs in to the image processing apparatus;

accepting an instruction from the user;

notifying an external apparatus of the accepted instruction;

receiving a processing request generated on a basis of the notified instruction from the external apparatus with second authentication information;

executing image processing in response to the received processing request;

permitting execution of the image processing in accordance with the received processing request if the processing request is received based on the instruction accepted from the user who logs in to the image processing apparatus; and restricting the user logging out from the image processing apparatus at least before the processing request is received since the instruction has been notified.

* * * * *